(12) United States Patent
Inuzuka

(10) Patent No.: US 9,206,089 B2
(45) Date of Patent: Dec. 8, 2015

(54) GAS PRESSURE ACTUATOR AND METHOD OF ASSEMBLING THE SAME

(71) Applicant: Koji Inuzuka, Tokyo (JP)

(72) Inventor: Koji Inuzuka, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/409,087

(22) PCT Filed: Jul. 11, 2013

(86) PCT No.: PCT/JP2013/069044
§ 371 (c)(1),
(2) Date: Dec. 18, 2014

(87) PCT Pub. No.: WO2014/010703
PCT Pub. Date: Jan. 16, 2014

(65) Prior Publication Data
US 2015/0175496 A1    Jun. 25, 2015

(30) Foreign Application Priority Data

Jul. 13, 2012  (JP) .................................. 2012-158057
Apr. 23, 2013  (JP) .................................. 2013-090306

(51) Int. Cl.
C06D 5/00  (2006.01)
B60R 21/38  (2011.01)
F15B 15/19  (2006.01)

(52) U.S. Cl.
CPC . *C06D 5/00* (2013.01); *B60R 21/38* (2013.01); *F15B 15/19* (2013.01)

(58) Field of Classification Search
CPC ............ B60R 21/38; C06D 5/00; F15B 15/19
See application file for complete search history.

(56) References Cited

U.S. PATENT DOCUMENTS

| 6,364,402 | B1 | 4/2002 | Sasaki |
| 6,938,715 | B2* | 9/2005 | Hamada et al. ............... 180/274 |
| 7,159,685 | B2 | 1/2007 | Knight-Newbury et al. |
| 7,246,677 | B2 | 7/2007 | Fredriksson et al. |
| 7,303,040 | B2 | 12/2007 | Green et al. |
| 7,621,364 | B2 | 11/2009 | Haglund |
| 7,650,957 | B2* | 1/2010 | Takakura et al. ............ 180/274 |
| 7,712,569 | B2 | 5/2010 | Scheuch et al. |
| 7,815,007 | B2 | 10/2010 | Mori et al. |

(Continued)

FOREIGN PATENT DOCUMENTS

| GB | 2375329 | 7/2004 |
| GB | 2410782 | 7/2007 |

(Continued)

OTHER PUBLICATIONS

International Search Report mailed on Oct. 1, 2013.

*Primary Examiner* — Laura Freedman
(74) *Attorney, Agent, or Firm* — IPUSA, PLLC

(57) ABSTRACT

The present invention relates to a gas pressure actuator and a method of assembling the gas pressure actuator. The gas pressure actuator includes a launcher having a cylindrical shape; a gas generator that is coaxial with the launcher, is disposed at a first axial end of the launcher, and generates a high-pressure gas when the gas pressure actuator is activated; and a hollow rocket part that is coaxial with the launcher, is open at the first axial end of the launcher, and closed at a second axial end of the launcher. A first axial end of the rocket part overlaps the gas generator in an axial direction before the gas pressure actuator is activated.

10 Claims, 18 Drawing Sheets

(56) References Cited

U.S. PATENT DOCUMENTS

| | | | |
|---|---|---|---|
| 7,931,111 B2 | 4/2011 | Kim et al. | |
| 7,946,376 B2 * | 5/2011 | Hayashi et al. | 180/274 |
| 8,141,671 B2 * | 3/2012 | Aoki et al. | 180/69.21 |
| 8,146,701 B2 | 4/2012 | Spannbauer | |
| 2006/0218918 A1 | 10/2006 | Hirooka et al. | |
| 2009/0145681 A1 * | 6/2009 | Hayashi et al. | 180/274 |
| 2012/0011847 A1 | 1/2012 | Borg et al. | |
| 2014/0360356 A1 * | 12/2014 | Wilmot et al. | 92/169.1 |
| 2015/0075402 A1 * | 3/2015 | Henck | 102/530 |
| 2015/0090111 A1 * | 4/2015 | Henck | 92/14 |

FOREIGN PATENT DOCUMENTS

| | | |
|---|---|---|
| JP | S62-080306 | 4/1987 |
| JP | H04-133005 | 12/1992 |
| JP | H07-317911 | 12/1995 |
| JP | H11-115680 | 4/1999 |
| JP | 3317441 | 8/2002 |
| JP | 2002-337660 | 11/2002 |
| JP | 2006-507973 | 3/2006 |
| JP | 2006-256396 | 9/2006 |
| JP | 3883983 | 2/2007 |
| JP | 3984154 | 10/2007 |
| JP | 2008056120 A * | 3/2008 |
| JP | 2009-292263 | 12/2009 |
| JP | 4741409 | 8/2011 |
| JP | 2012-509813 | 4/2012 |
| JP | 5052188 | 10/2012 |
| JP | 5165248 | 3/2013 |
| JP | 5208890 | 6/2013 |
| JP | 5353853 | 11/2013 |
| JP | 5489767 | 5/2014 |
| WO | 2012/144940 | 10/2012 |

* cited by examiner (A)

(B)

(A)　　　　　　　　　　　　(B)

(A)　　　　　　　(B)

(A)  (B)

(A)  (B)

(A)    (B)

(A)    (B)

(B)

(A) (C)

(A) (B)

GAS PRESSURE ACTUATOR AND METHOD OF ASSEMBLING THE SAME

TECHNICAL FIELD

The present invention relates to a gas pressure actuator and a method of assembling the gas pressure actuator. Particularly, the present invention relates to a gas pressure actuator that is extended by causing a rocket part to protrude from an end in an axial direction of a launcher using a high-pressure gas generated by a gas generator, and a method of assembling the gas pressure actuator.

BACKGROUND ART

There exists a known gas pressure actuator that is used, for example, for a device to lift a hood of a motor vehicle, and is extended by a high-pressure gas generated by a gas generator (see, for example, Patent Document 1). The gas pressure actuator includes the gas generator, a body cylinder, and a piston rod. The gas generator is disposed at an end in an axial direction of the body cylinder. The piston rod is lined up with the gas generator in the axial direction so that a piston is slidable along the inner wall of the body cylinder, and the piston rod can protrude from the other end in the axial direction of the body cylinder.

In the gas pressure actuator described above, when the gas generator generates the high-pressure gas, the high-pressure gas acts on a surface of the piston facing the gas generator in the axial direction, and the piston receives a force that presses the piston in the axial direction. When such a pressing force is generated, the piston slides in the body cylinder and is displaced in the axial direction. As a result, the gas pressure actuator is extended in the axial direction.

RELATED-ART DOCUMENT

Patent Document

[Patent Document 1] Japanese Laid-Open Patent Publication No. 2011-162136

DISCLOSURE OF INVENTION

Problems to be Solved by the Invention

However, with a configuration where a gas pressure actuator includes a piston rod including a piston that is lined up with a gas generator in an axial direction and slides on the inner wall of a tubular body cylinder, the piston having a thickness in the axial direction needs to be housed in the body cylinder even when a high-pressure gas is generated and the piston rod is displaced in the axial direction relative to the body cylinder up to the maximum stroke. That is, even when the displacement of the piston rod reaches the maximum stroke, the body cylinder and at least the piston of the piston rod need to overlap each other in the axial direction.

For this reason, the amount of extension in the axial direction of the gas pressure actuator is limited. Accordingly, to achieve a desired stroke length, it is necessary to increase the size of the gas pressure actuator before activation, i.e., before the high-pressure gas is generated. On the other hand, when the size of the gas pressure actuator is increased, the gas pressure actuator may not be able to be placed in a desired space. This in turn indicates that a desired stroke length may not be achieved when the gas pressure actuator needs to be placed in a small space.

The present invention is made to solve or reduce the above problems. One object of the present invention is to provide a gas pressure actuator that is compact and still has a long stroke length in an axial direction, and a method of assembling the gas pressure actuator.

Means for Solving the Problems

The above object is achieved by a gas pressure actuator that includes a launcher having a cylindrical shape; a gas generator that is coaxial with the launcher, is disposed at a first axial end of the launcher, and generates a high-pressure gas when the gas pressure actuator is activated; and a hollow rocket part that is coaxial with the launcher, is open at the first axial end of the launcher, and is closed at a second axial end of the launcher. A first axial end of the rocket part overlaps the gas generator in an axial direction before the gas pressure actuator is activated.

The above object is also achieved by a method of assembling a gas pressure actuator that includes a launcher having a cylindrical shape; a gas generator that is coaxial with the launcher, is disposed at a first axial end of the launcher, and generates a high-pressure gas when the gas pressure actuator is activated; and a hollow rocket part that is coaxial with the launcher, is open at the first axial end of the launcher, and is closed at a second axial end of the launcher, a first axial end of the rocket part overlapping the gas generator in an axial direction before the gas pressure actuator is activated. The method includes a first step of inserting the gas generator into an opening of a first axial end of the rocket part; a second step of inserting the rocket part, which houses the gas generator that is inserted in the first step into the opening at the first axial end of the rocket part, into a tubular space of the launcher such that the gas generator is disposed at the first axial end; and a third step of fixing a stroke limiting part to the second axial end of the launcher housing the rocket part inserted in the second step into the tubular space, the stroke limiting part preventing a stroke of the rocket part and the launcher from exceeding a predetermined stroke length.

Advantageous Effect of the Invention

The present invention makes it possible to provide a gas pressure actuator that is compact and still has a long stroke length in an axial direction.

DESCRIPTION OF EMBODIMENTS

A gas pressure actuator and a method of assembling the gas pressure actuator according to embodiments of the present invention are described below with reference to the accompanying drawings.

Figure 1:
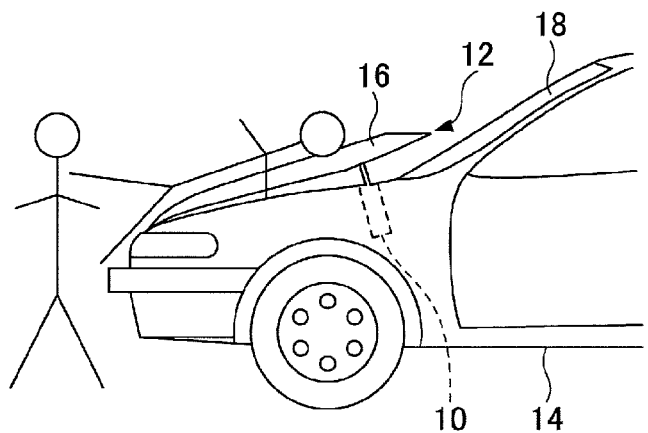
FIG. 1 is a side view of a vehicle including a vehicle-hood lifting device using a gas pressure actuator according to an embodiment of the present invention.

FIG. 1 is a side view of a vehicle 14 including a vehicle-hood lifting device 12 using a gas pressure actuator 10 according to an embodiment of the present invention.

In the present embodiment, the gas pressure actuator 10 is activated when a collision between the vehicle 14 and a pedestrian is detected or the collision is predicted, and the vehicle-hood lifting device 12 lifts a windshield side of a hood 16 adjacent to a windshield 18 of the vehicle 14 from below. When the windshield side of the hood 16 is lifted, a space below the hood 16 increases and acts as a cushion. Thus, the vehicle-hood lifting device 12 alleviates an impact applied by the hood 16 to a pedestrian who is hit, for example, by a front bumper of the vehicle 14 and also prevents the pedestrian from colliding with the windshield 18.

Figure 2:
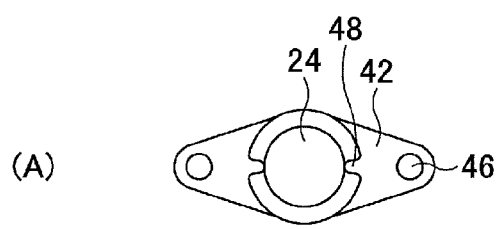
FIG. 2 is a drawing illustrating a configuration of a gas pressure actuator according to an embodiment.
Figure 2:
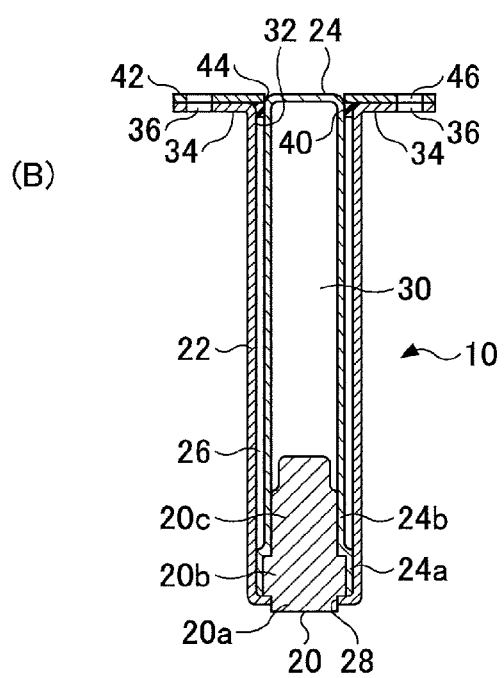
Figure 3:
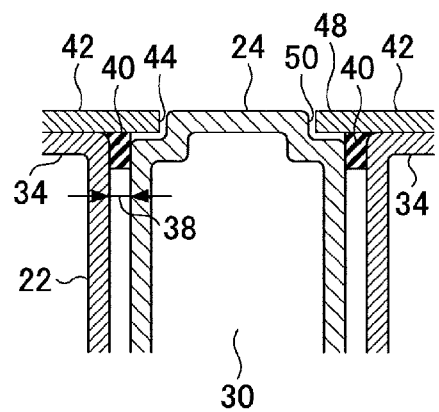
FIG. 3 is an enlarged cut-away side view of a part of a gas pressure actuator according to an embodiment.

FIG. 2 is a drawing illustrating a configuration of the gas pressure actuator 10 according to the present embodiment. FIG. 2 (A) is a top view of the gas pressure actuator 10, and FIG. 2 (B) is a cut-away side view of the gas pressure actuator 10 before activation. FIG. 3 is an enlarged cut-away side view of a part of the gas pressure actuator 10 according to the present embodiment.

In the present embodiment, the gas pressure actuator 10 includes a gas generator 20. The gas generator 20 is a gas generating part that generates a high-pressure gas. The gas generator 20 is connected via a signal line to a controller, and generates the high-pressure gas according to a driving instruction from the controller. The gas pressure actuator 10 is activated and extended by the high-pressure gas generated by the gas generator 20.

The gas pressure actuator 10 also includes a launcher 22 and a rocket part 24. The launcher 22 has a cylindrical shape and extends in an axial direction. The launcher 22 has a predetermined length (e.g., 110 mm) in the axial direction. The launcher 22 has a tubular space to house and cover the rocket part 24 before activation. The launcher 22 is a launching tube where the rocket part 24 placed in the tubular space 26 is caused to be displaced and move forward in the axial direction.

The gas generator 20 has a columnar shape. The gas generator 20 has a predetermined length (e.g., 30 mm) in the axial direction. The gas generator 20 is placed in the tubular space 26 of the launcher 22, and is surrounded by the launcher 22. The gas generator 20 is coaxial with the launcher 22, and is disposed at a first axial end (a lower end in FIG. 2 (B)) of the launcher 22. The signal line connecting the gas generator 20 and the controller is connected to the gas generator 20 at the first axial end of the launcher 22.

An opening 28 facing in the axial direction is formed in a first axial end face of the launcher 22. The opening 28 has a diameter that is less than the inside diameter of the body (i.e., the tubular space 26) of the launcher 22. The gas generator 20 includes a first small diameter part 20a having an outside diameter that is substantially the same as or slightly less than the diameter of the opening 28, a large diameter part 20b having an outside diameter that is greater than the diameter of the opening 28, and a second small diameter part 20c having an outside diameter that is less than the diameter of the large diameter part 20b.

The small diameter part 20a is disposed at the first axial end, the large diameter part 20b is disposed adjacent to a second axial end (an upper end in FIG. 2 (B)) of the first small diameter part 20a, and the second small diameter part 20c is disposed adjacent to the second axial end of the large diameter part 20b. Thus, the gas generator 20 is configured such that steps are formed by the first small diameter part 20a, the large diameter part 20b, and the second small diameter part 20c arranged in sequence from the first axial end. The first small diameter part 20a is fit into the opening 28, and the entire circumference of a first axial end face of the large diameter part 20b is in contact with an inner first axial end face of the launcher 22. Thus, the gas generator 20 is supported by the launcher 22 at the first axial end.

The rocket part 24 is coaxial with the launcher 22, and has a cylindrical shape that extends in the axial direction. The rocket part 24 is in the tubular space 26 of the launcher 22 before activation. The rocket part 24 has a predetermined length (e.g., 110 mm) in the axial direction that is substantially the same as the length of the launcher 22. The rocket part 24 has a hollow structure that is open at the first axial end of the launcher 22 and is closed at the second axial end.

Throughout its length in the axial direction, the outside diameter of the rocket part 24 is less than the inside diameter of the body (i.e., the tubular space 26) of the launcher 22. A predetermined gap (with a length of, for example, 0.1 mm to 3 mm) is formed between the outer wall of the rocket part 24 and the inner wall of the launcher 22. The rocket part 24 includes a large diameter part 24a with an inside diameter that is substantially the same as or slightly greater than the outside diameter of the large diameter part 20b of the gas generator 20, and a small diameter part 24b with an inside diameter that is less than the inside diameter of the large diameter part 24a and is substantially the same as or slightly greater than the outside diameter of the second small diameter part 20c of the gas generator 20.

The inside diameter of the small diameter part 24b is preferably set at a minimum value that is necessary to house the gas generator 20 and to provide a predetermined clearance between the tip of the rocket part 24 and the hood 16 before the activation of the gas pressure actuator 10. Also, the outside diameter of the small diameter part 24b is preferably set at a minimum value that is necessary to achieve a safety factor required for a pressure vessel at the maximum internal pressure of a space 30 that is determined taking into account the full load and the temperature.

The large diameter part 24a is disposed at the first axial end, and the small diameter part 24b is disposed adjacent to the second axial end of the large diameter part 24a. The small diameter part 24b extends from the boundary between the small diameter part 24b and the large diameter part 24a to an end face at the second axial end. Thus, the rocket part 24 is configured such that a step is formed by the large diameter part 24a and the small diameter part 24b arranged in sequence from the first axial end, and has an opening whose diameter is slightly greater than the other part of the rocket part 24.

The gas generator 20 is inserted into the first axial end of the rocket part 24. The second small diameter part 20c of the gas generator 20 is fit into the small diameter part 24b of the rocket part 24, and the large diameter part 20b of the gas generator 20 is fit into the large diameter part 24a of the rocket part 24. The entire circumference of a second axial end face of the large diameter part 20b is in contact with the step between the large diameter part 24a and the small diameter part 24b of the rocket part 24, and the gas generator 20 is thereby supported by the rocket part 24. When the gas generator 20 is inserted into the first axial end of the rocket part 24, the internal space of the rocket part 24 is closed by the gas generator 20 and the space 30 is formed. The high-pressure gas generated by the gas generator 20 flows into the space 30 in the rocket part 24.

An opening 32 facing in the axial direction is formed in a second axial end face of the launcher 22. The opening 32 has a diameter that is greater than the outside diameter of the rocket part 24. A flange 34 extending outward in a radial direction is formed at the second axial end of the launcher 22. The flange 34 is formed at the second axial end of the launcher 22 as an integral part of the launcher 22. The flange 34 preferably has a shape that is symmetric with respect to the axial center (in the example of FIG. 2, two parts of the flange 34 are arranged symmetrically about the axial center). The flange 34 has through holes 36 that pass through the flange 34 in the axial direction. The through holes 36 are used to fix the launcher 22 to an object (e.g., the body of the vehicle 14) with bolts inserted into the through holes 36. The flange 34 functions as a fixing bracket for fixing the launcher 22 to the body of the vehicle 14.

When the rocket part 24 is placed in the tubular space 26 of the launcher 22 before activation, the position in the axial direction of the second axial end of the launcher 22 is substantially the same as the position in the axial direction of the second axial end of the rocket part 24. Because the diameter of the opening 32 formed in the second axial end face of the launcher 22 is greater than the outside diameter of the rocket part 24 as described above, a gap 38 is formed between the second axial end of the launcher 22 and the second axial end of the rocket part 24.

A gasket 40 for filling the gap 38 is provided between the second axial end of the launcher 22 and the second axial end of the rocket part 24. The gasket 40 is made of, for example, a resin material and is provided to seal the gap 38 between the launcher 22 and the rocket part 24 at the second axial end before activation. The gasket 40, for example, has a ring shape and is implemented by an O-ring that surrounds the outer circumference of the rocket part 24. The gasket 40 has an outside diameter that is substantially the same as the inside diameter of the body of the launcher 22, and has an inside diameter that is substantially the same as the diameter of an opening 44 of an end plate 42 described below.

The end plate 42 is disposed adjacent to the second axial end of the launcher 22 in the axial direction. The end plate 42 is provided separately from the launcher 22, and has a flat shape that is substantially the same as the shape of the flange 34 of the launcher 22. The end plate 42 is in contact with the second axial end face of the flange 34 of the launcher 22, and is fixed, together with the flange 34 of the launcher 22, to an object (e.g., the body of the vehicle 14).

The opening 44 facing in the axial direction is formed in the end plate 42. The opening 44 is coaxial with the launcher 22 and the rocket part 24, and is configured such that the rocket part 24 can pass through the opening 44 when the gas pressure actuator 10 is activated. The opening 44 has a diameter that is substantially the same as or slightly greater than the outside diameter of the second axial end of the rocket part 24 (i.e., the outside diameter of the small diameter part 24b), and is less than the inside diameter of the second axial end of the launcher 22. Also, the diameter of the opening 44 is less than the outside diameter of the first axial end of the rocket part 24 (i.e., the outside diameter of the large diameter part 24a).

The end plate 42 also has through holes 46 that pass through the end plate 42 in the axial direction. The through holes 46 are used to fix the end plate 42, together with the launcher 22, to an object (e.g., the body of the vehicle 14) with bolts inserted into the through holes 46. The through holes 46 are formed at positions on the end plate 42 that are aligned with the positions of the through holes 36 of the flange 34 of the launcher 22 when the end plate 42 is fixed to the body of the vehicle 14 together with the launcher 22. The diameter of the through holes 46 is substantially the same as the diameter of the through holes 36.

The end plate 42 also includes protrusions 48 that protrude from the inner wall of the opening 44 toward the axial center. The diameter of the opening 44 at a position where the protrusions 48 are formed is slightly less than the outside diameter of the body of the rocket part 24 (i.e., the outside diameter of the small diameter part 24b). An indented part 50 corresponding to the protrusions 48 is formed at the second axial end of the rocket part 24. The protrusions 48 are used to (initially) position the second axial end of the rocket part 24 when the rocket part 24 is placed in the tubular space 26 of the launcher 22. When the gas pressure actuator 10 is activated and the rocket part 24 passes through the opening 44, the protrusions 48 are bent and deformed or fractured and almost do not influence the displacement of the rocket part 24.

The protrusions 48 may either constitute the entire circumference or parts of the circumference of the opening 44 (in the example of FIG. 2 (A), the protrusions 48 are formed at two positions in the entire circumference of the opening 44). When the protrusions 48 constitute parts of the entire circumference of the opening 44, the protrusions 48 are preferably formed at symmetrical positions with respect to the axial center of the opening 44.

Also, a sealing part 52 is attached to the end plate 42 to close the opening 44 before the activation of the gas pressure actuator 10, i.e., when the rocket part 24 is in the tubular space 26 of the launcher 22. For example, the sealing part 52 may be pasted to the surface of the end plate 42. The sealing part 52 covers the tip of the rocket part 24, and is removed by the rocket part 24 when the rocket part 24 is displaced and passes through the opening 44.

Figure 4:
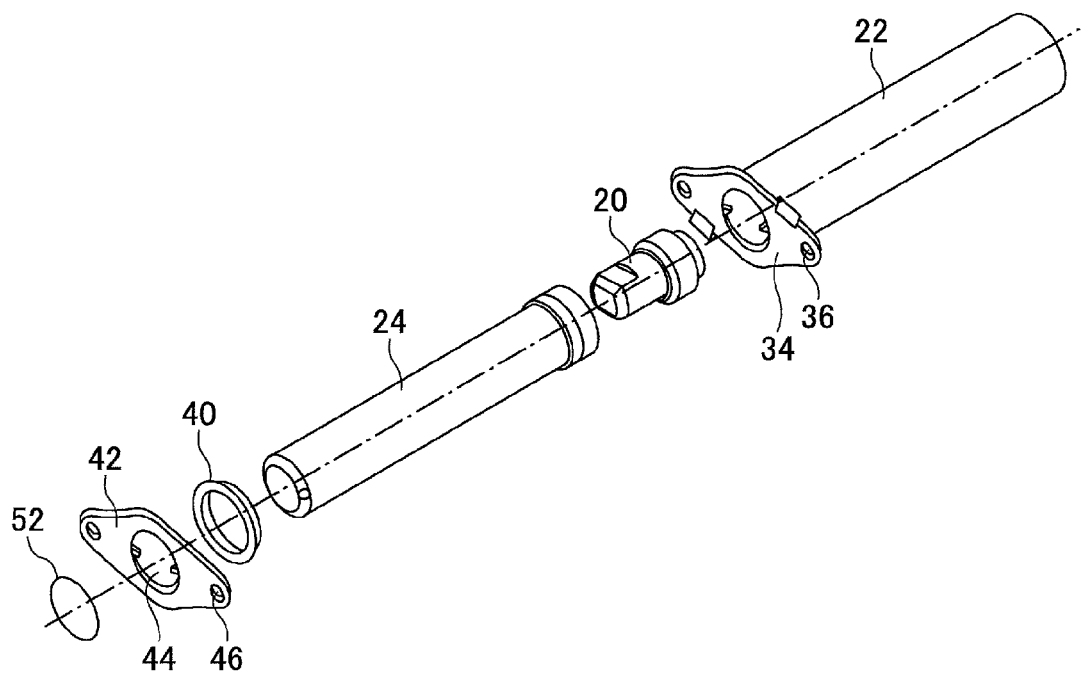
FIG. 4 is an exploded perspective view of a gas pressure actuator according to an embodiment.
Figure 5:
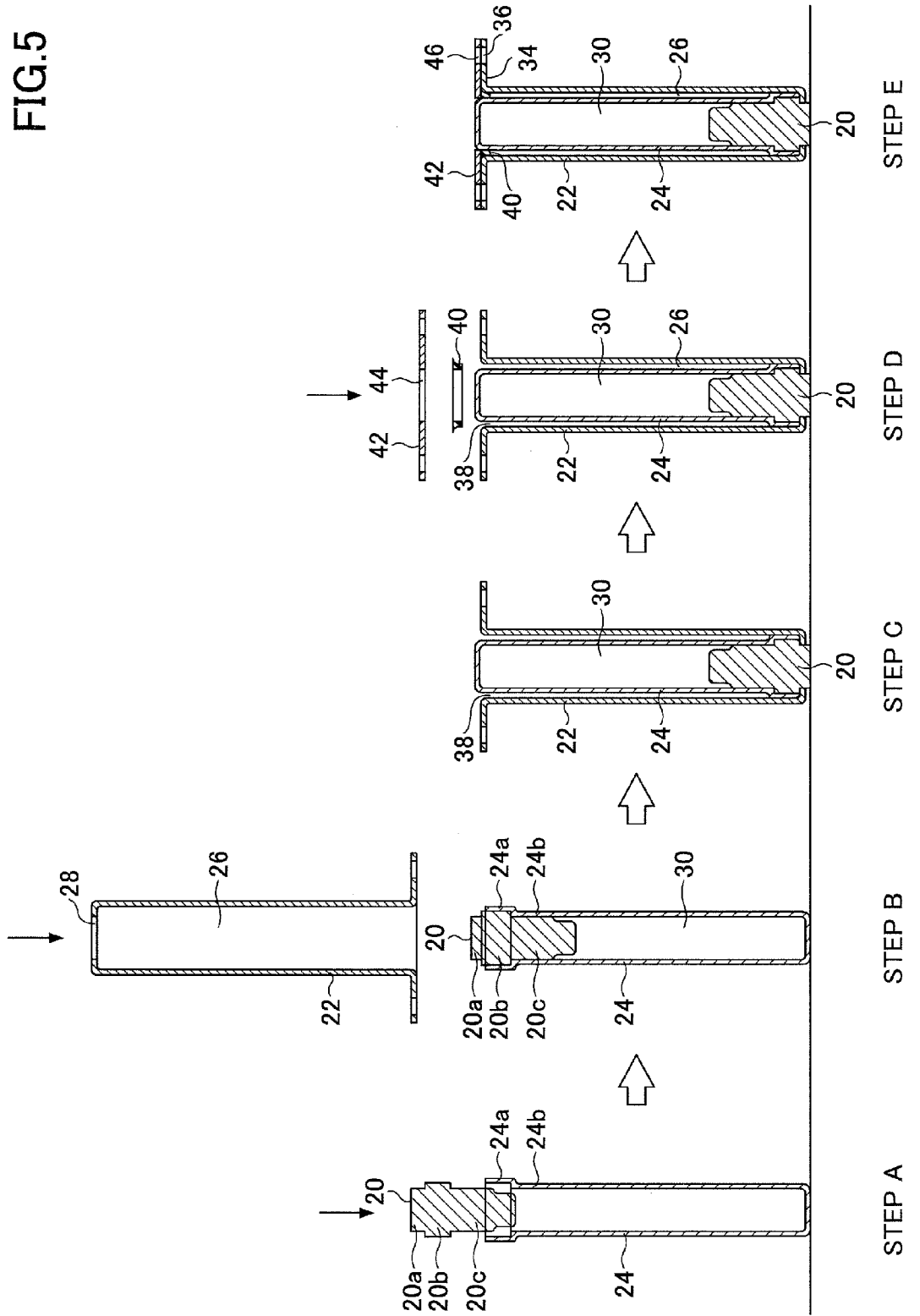
FIG. 5 is a drawing illustrating an exemplary process of assembling a gas pressure actuator according to an embodiment.

Next, a method of assembling the gas pressure actuator 10 of the present embodiment is described with reference to FIGS. 4 and 5. FIG. 4 is an exploded perspective view of the gas pressure actuator 10 of the present embodiment. FIG. 5 is a drawing illustrating an exemplary process of assembling the gas pressure actuator 10 of the present embodiment.

In the present embodiment, in assembling the gas pressure actuator 10, the gas generator 20 having a columnar shape is first inserted into an opening in the first axial end face of the rocket part 24 in a direction from the first axial end toward the closed second axial end, i.e., an opposite end, of the rocket part 24 (step A). As a result of step A, the second small diameter part 20c of the gas generator 20 is fit into the small diameter part 24b of the rocket part 24, the large diameter part 20b of the gas generator 20 is fit into the large diameter part 24a of the rocket part 24, the entire circumference of the second axial end face of the large diameter part 20b is brought into contact with the step between the large diameter part 24a and the small diameter part 24b of the rocket part 24, and the gas generator 20 is thereby supported by the rocket part 24 (see step B in FIG. 5). As a result of inserting the gas generator 20, the closed space 30 is formed in the rocket part 24.

Next, the cylindrical launcher 22 is moved in a direction from the first axial end toward the second axial end of the rocket part 24 to cover the rocket part 24 supporting the gas generator 20 (step B). As a result of step B, the rocket part 24 is inserted into the tubular space 26 of the launcher 22 and covered by the launcher 22, the first small diameter part 20a of the gas generator 20 is fit into the opening 28 of the launcher 22, the entire circumference of the first axial end face of the large diameter part 20b of the gas generator 20 is brought into contact with the inner first axial end face of the launcher 22, and the gas generator 20 is thereby supported at the first axial end of the launcher 22 (see step C of FIG. 5).

Next, the launcher 22 supporting the gas generator 20 is held such that the first axial end of the launcher 22 faces downward and the second axial end of the launcher 22 faces upward (step C). At this stage, the gap 38 is formed between the second axial end of the launcher 22 and the second axial end of the rocket part 24.

Next, the gasket 40 is placed between the second axial end of the launcher 22 and the second axial end of the rocket part 24, and then the end plate 42 is placed on the launcher 22 (step D). Then, the end place 42 and the launcher 22 housing the rocket part 24 in the tubular space 26 are fixed and combined together (step E). In step E, the end place 42 and the launcher 22 may be temporarily fixed together using, for example, a clip.

As a result of steps D and E, the gap 38 between the second axial end of the launcher 22 and the second axial end of the rocket part 24 is filled with the gasket 40 and sealed, the protrusions 48 of the end plate 42 engage the indented part 50 at the second axial end of the rocket part 24, and the rocket part 24 is thereby retained in the tubular space 26 of the launcher 22 and positioned with respect to the launcher 22 (see step E in FIG. 5).

Thereafter, when the gas pressure actuator 10 is applied to the vehicle-hood lifting device 12, the temporarily-fixed end plate 42 and launcher 22 are unfixed, and the end plate 42 and the launcher 22 are fixed to the body of the vehicle 14 with bolts passing through the through holes 46 and 36. Even after the end plate 42 and the launcher 22 are fixed to the body of the vehicle 14, the gap 38 between the launcher 22 and the rocket part 24 is still sealed, and the rocket part 24 is still positioned with respect to the launcher 22 in the initial state.

Figure 6:
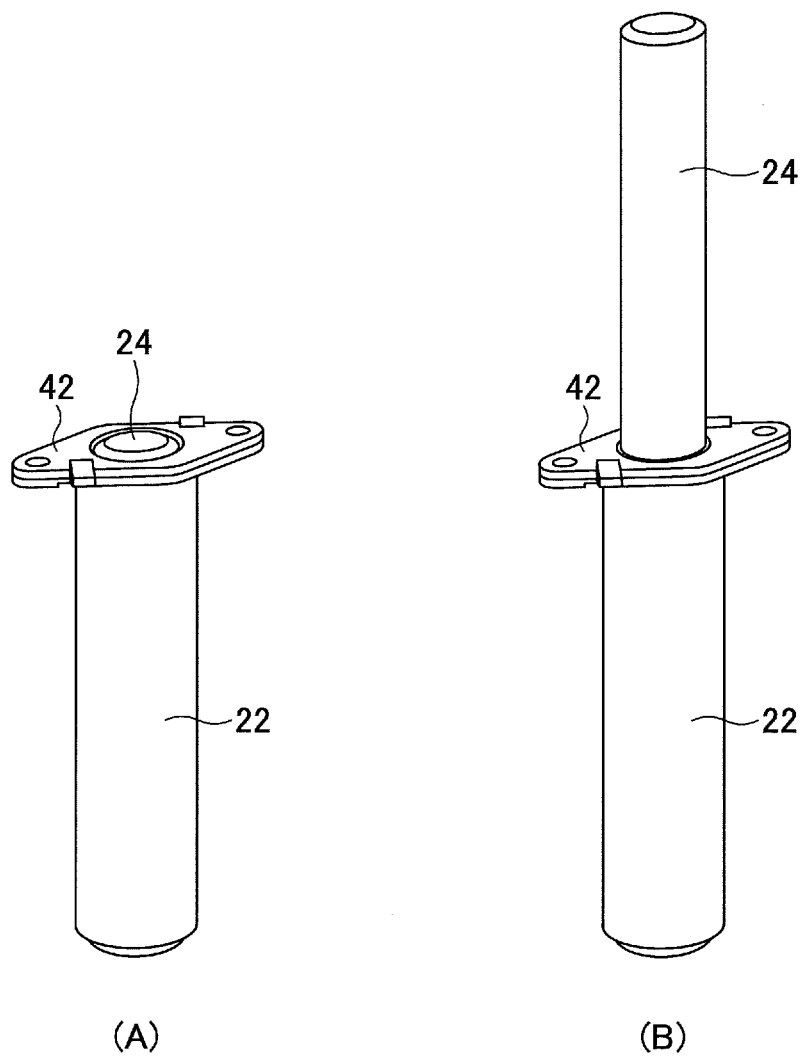
FIG. 6 is a drawing including perspective views used to describe operations of a gas pressure actuator according to an embodiment.
Figure 7:
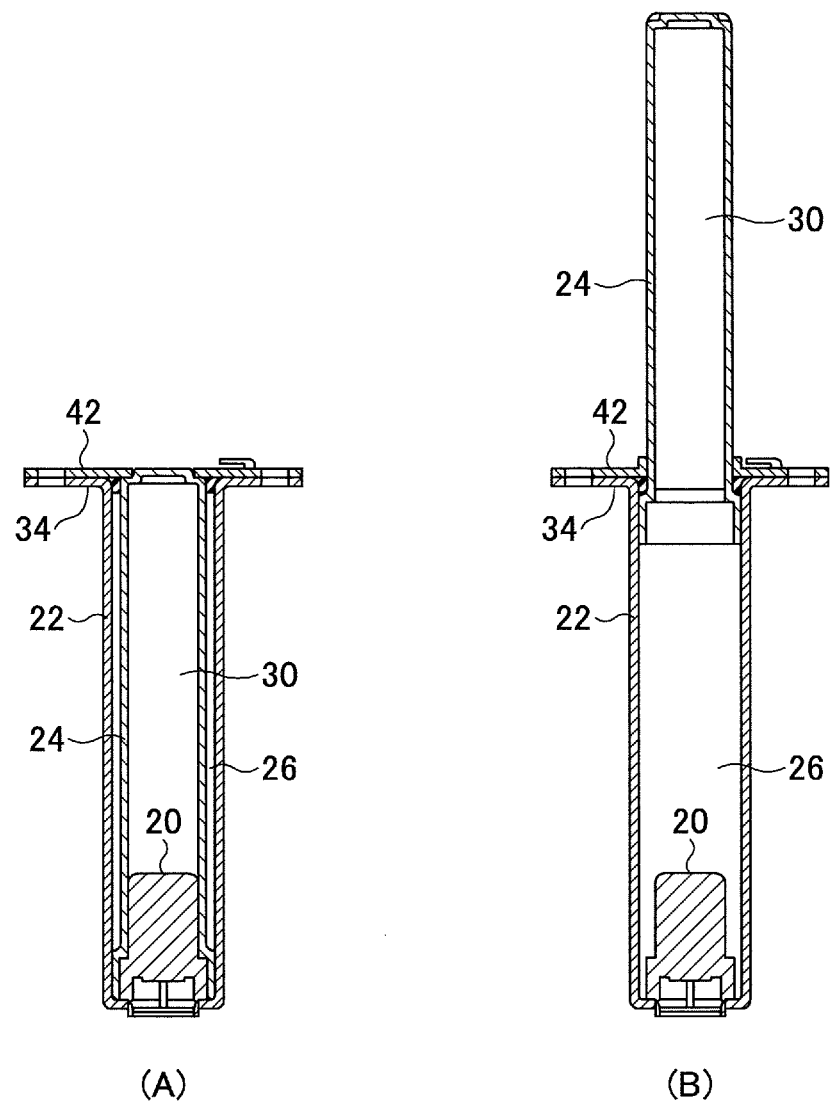
FIG. 7 is a drawing including cut-away side views used to describe operations of a gas pressure actuator according to an embodiment.

FIG. 6 is a drawing including perspective views used to describe operations of the gas pressure actuator 10 of the present embodiment. FIG. 7 is a drawing including cut-away side views used to describe operations of the gas pressure actuator 10 of the present embodiment. FIG. 6 (A) and FIG. 7 (A) illustrate a pre-stroke state (before activation), and FIG. 6 (B) and FIG. 7 (B) illustrate a post-stroke state (after activation).

When the gas pressure actuator 10 of the present embodiment is assembled as described above, in the initial state before the gas pressure actuator 10 is activated, the rocket part 24 is in the tubular space 26 of the launcher 22 (see FIG. 6 (A) and FIG. 7 (A). When a collision between the vehicle 14 and a pedestrian is detected or the collision is predicted, the controller determines that it is necessary to activate the gas pressure actuator 10 and sends a driving instruction via the signal line to the gas generator 20.

When receiving the driving instruction, the gas generator 20 operates and generates a high-pressure gas. The generated high-pressure gas flows into the space 30 in the rocket part 24 at the first axial end of which the gas generator 20 is disposed. When the high-pressure gas flows into the space 30, the large diameter part 24a of the rocket part 24 slides on the inner wall of the launcher 22 fixed to the body of the vehicle 14, and the rocket part 24 is immediately displaced toward the second axial end relative to the launcher 22 and moves upward in FIG. 6 (B) and FIG. 7 (B).

When the gas pressure actuator 24 is activated as described above, the windshield side of the hood 16 adjacent to the windshield 18 of the vehicle 14 is lifted, and a large space is formed below the hood 16. Thus, the vehicle-hood lifting device 12 of the present embodiment alleviates an impact applied by the hood 16 to a pedestrian who collides with the vehicle 14, and also prevents the pedestrian from colliding with the windshield 18.

The large diameter part 24a at the first axial end of the rocket part 24 has an outside diameter that is substantially the same as or slightly less than the inside diameter of the launcher 22, and is greater than the diameter of the opening 44 of the end plate 42. For this reason, when the rocket part 24 is displaced toward the second axial end relative to the launcher 22, the displacement is allowed until the second axial end face of the large diameter part 24a of the rocket part 24 contacts a surface of the end plate 42 (more specifically, the gasket 40) facing the first axial end, and further displacement (stroke) of the rocket part 24 is prevented after the second axial end face of the large diameter part 24a contacts the end plate 42. This configuration of the present embodiment makes it possible to prevent the rocket part 24 from jumping out of the internal space 26 of the launcher 22 and coming off the launcher 22 when the gas pressure actuator 10 is activated, and makes it possible to make the stroke length of the activated gas pressure actuator 10 constant.

Before the gas pressure actuator 10 of the present embodiment is activated, the second small diameter part 20c of the gas generator 20 is fit into the small diameter part 24b of the rocket part 24, the large diameter part 20b of the gas generator 20 is fit into the large diameter part 24a of the rocket part 24, the entire circumference of the second axial end face of the large diameter part 20b is in contact with the step between the large diameter part 24a and the small diameter part 24b of the rocket part 24, and the gas generator 20 is thereby supported by the rocket part 24.

With this configuration, before the gas pressure actuator 10 is activated, a first axial end part of the rocket part 24 extends to overlap the gas generator 20 in the axial direction and faces the side wall of the gas generator 20. That is, the columnar gas generator 20 and the hollow rocket part 24 overlap each other in the axial direction. Also, no piston is provided in the space inside of the hollow rocket part including the first axial end part overlapping the gas generator 20 in the axial direction.

With this configuration, the displacement of the rocket part 24 toward the second axial end relative to the launcher 22 is allowed until the first axial end of the rocket 24 reaches a position near the end plate 42. That is, this configuration makes it possible to achieve the maximum stroke length of the rocket part 24 in the axial direction that is close to the entire length of the rocket part 24 itself. Also, this configuration makes it possible to minimize the length by which the rocket part 24 and the launcher 22 overlap each other in the axis direction when the displacement of the rocket part 24 reaches the maximum stroke (e.g., 90 mm). This in turn makes it possible to achieve a long stroke length in the axial direction while reducing the length and height of the gas pressure actuator 10 before activation. Thus, the configuration of the present embodiment makes it possible to provide the gas pressure actuator 10 that is compact and still has a long stroke length in the axial direction.

That is, the present embodiment makes it possible to install the gas pressure actuator 10 with a desired stroke length even when a space below the hood 16 is small. In other words, the present embodiment makes it possible to reduce the space necessary to install a gas pressure actuator with a desired stroke length.

Figure 8:
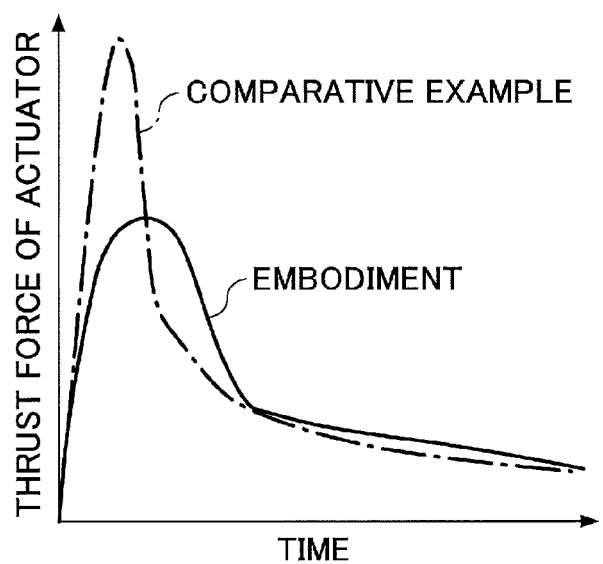
FIG. 8 is a graph used to describe effects in an operation of a gas pressure actuator according to an embodiment.

Here, with a configuration (comparative configuration) where, unlike the present embodiment, the gas generator 20 and the rocket part 24 do not overlap each other in the axial direction, it is necessary to dispose the gas generator 20 and a piston on the rocket part 24 close to each other in the axial direction to reduce the size of a gas pressure actuator. However, with the comparative configuration, the initial volume of the space between the gas generator 20 and the piston on the rocket part 24 becomes small. As a result, as indicated by a dashed-dotted line in FIG. 8, the pressure of a gas generated by the gas generator 20 upon activation becomes excessively high, and the force thrusting the rocket part 24 upward relative to the launcher 22 becomes excessively strong.

On the other hand, with the configuration of the present embodiment where the gas generator 20 and the rocket part 24 overlap each other in the axial direction, it is not necessary to dispose the gas generator 20 and a piston on the rocket part 24 close to each other in the axial direction. For this reason, as indicated by a solid line in FIG. 8, the configuration of the gas pressure actuator 10 makes it possible to prevent the pressure of a gas generated by the gas generator 20 upon activation from becoming excessively high and to reduce the force thrusting the rocket part 24 upward relative to the launcher 22.

Also in the gas pressure actuator 10 of the present embodiment, the flange 34, which functions as a fixing bracket for fixing the launcher 22 to an object such as the vehicle 14, is formed at the second axial end of the launcher 22 as an integral part of the launcher 22. Compared with a configuration where a fixing bracket is provided separately from the launcher 22, the configuration of the gas pressure actuator 10 of the present embodiment makes it possible to reduce the number of components necessary to fix the launcher 22 to an object such as the vehicle 14. Thus, the present embodiment makes it possible to simplify the process of assembling the gas pressure actuator 10 and reduce the number of steps in the process.

Also in the gas pressure actuator 10 of the present embodiment, the rocket part 24, which is displaced upon activation, has the internal space 30 and has a relatively large diameter throughout its length between the first and second axial ends. This configuration makes it possible to prevent the pressure per unit area, which is applied when the windshield side of the hood 16 adjacent to the windshield 18 is lifted by the displacement of the rocket part 24 upon activation of the gas pressure actuator 10, from becoming excessively large and makes it possible to reliably generate a force necessary for the lifting. Also with this configuration, unlike a configuration where a gas pressure actuator operates by displacing a piston rod with a small diameter, it is not necessary to attach a head with a large diameter at an end of the piston rod. This in turn makes it possible to reduce the number of components, simplify the process of assembling the gas pressure actuator 10, and reduce the number of steps in the process.

Also in the gas pressure actuator 10 of the present embodiment, the gasket 40 for filling the gap 38 is provided between the second axial end of the launcher 22 and the second axial end of the rocket part 24. The gasket 40 seals the gap 38 between the second axial end of the launcher 22 and the second axial end of the rocket part 24 before the gas pressure actuator 10 is activated. Accordingly, the gasket 40 makes it possible to prevent, for example, water from entering the tubular space 26 of the launcher 22, and prevent fire from being emitted from the tubular space 26 of the launcher 22 when the gas generator 20 is activated.

With the gas pressure actuator 10 of the present embodiment, when the end plate 42 and the launcher 22 housing the rocket part 24 in the tubular space 26 are fixed to the vehicle 14 by using bolts, the protrusions 48 of the end plate 42 engage the indented part 50 at the second axial end of the rocket part 24 and the rocket part 24 is thereby positioned with respect to the launcher 22.

When the rocket part 24 is positioned, the first diameter part 20a of the gas generator 20 is fit into the opening 28 of the launcher 22, the entire circumference of the first axial end face of the large diameter part 20b of the gas generator 20 is brought into contact with the inner first axial end face of the launcher 22, and the gas generator 20 is thereby supported by the launcher 22 at the first axial end and prevented from being displaced toward the first axial end. At the same time, the second small diameter part 20c of the gas generator 20 is fit into the small diameter part 24b of the rocket part 24, the large diameter part 20b of the gas generator 20 is fit into the large diameter part 24a of the rocket part 24, the entire circumference of the second axial end face of the large diameter part 20b of the gas generator 20 is brought into contact with the step between the large diameter part 24a and the small diameter part 24b of the rocket part 24, and the gas generator 20 is thereby supported by the rocket part 24 and prevented from being displaced toward the second axial end.

With this configuration, the gas generator 20 is fixed relative to the launcher 22 and the rocket part 24, and the gas generator 20 functions as a cap of the rocket part 24 to form the closed space 30 in the rocket part 24. Thus, according to the present embodiment, the gas generator 20, the launcher 22, and the rocket part 24 can be placed in a desired positional relationship, and undesired leakage of the high-pressure gas generated by the gas generator 20 from the space 30 of the rocket part 24 can be prevented by just fixing the end plate 42 and the launcher 22 housing the rocket part 24 in the tubular space 26 to the vehicle 14 using bolts.

In the above embodiment, the gas generator 20 corresponds to a "gas generator" in the claims, the flange 34 corresponds to a "fixing bracket" in the claims, the opening 44 corresponds to an "opening" in the claims, the end plate 42 having the opening 44 with a diameter less than the outside diameter of the large diameter part 24a at the first axial end of the rocket part 24 corresponds to a "stroke limiting part" in the claims, step A corresponds to a "first step" in the claims, step B corresponds to a "second step" in the claims, and step D corresponds to a "third step" in the claims.

In the above embodiment, after the gas pressure actuator 10 is assembled and before the gas pressure actuator 10 is activated, the gas generator 20 functions as a cap of the rocket part 24 to form the closed space 30 in the rocket part 24. The volume (effective spatial volume) of the space 30 that is to be filled with the generated high-pressure gas and contributes to the displacement of the rocket part 24 in the axial direction may be changed depending on, for example, the type of the vehicle 14. For example, the effective spatial volume in the total spatial volume of the space 30 may be reduced by placing a columnar object with a predetermined volume or a cuboid object with a predetermined volume in the space 30, or by changing the number of such objects placed in the space 30. Insert objects such as a columnar object and a cuboid object to be placed in the space 30 may be made of a resin material.

With this variation of the above embodiment, it is possible to change the operational speed of the same gas pressure actuator 10 depending on requirements (e.g., types of vehicles). This in turn makes it possible to use the same gas pressure actuator 10 for various requirements by changing the effective spatial volume, and thereby makes it possible to improve the productivity of the gas pressure actuator 10. In this variation, the insert object such as a columnar object or a cuboid object to be placed in the space 30 corresponds to a "volume reducing part" in the claims.

Figure 9:
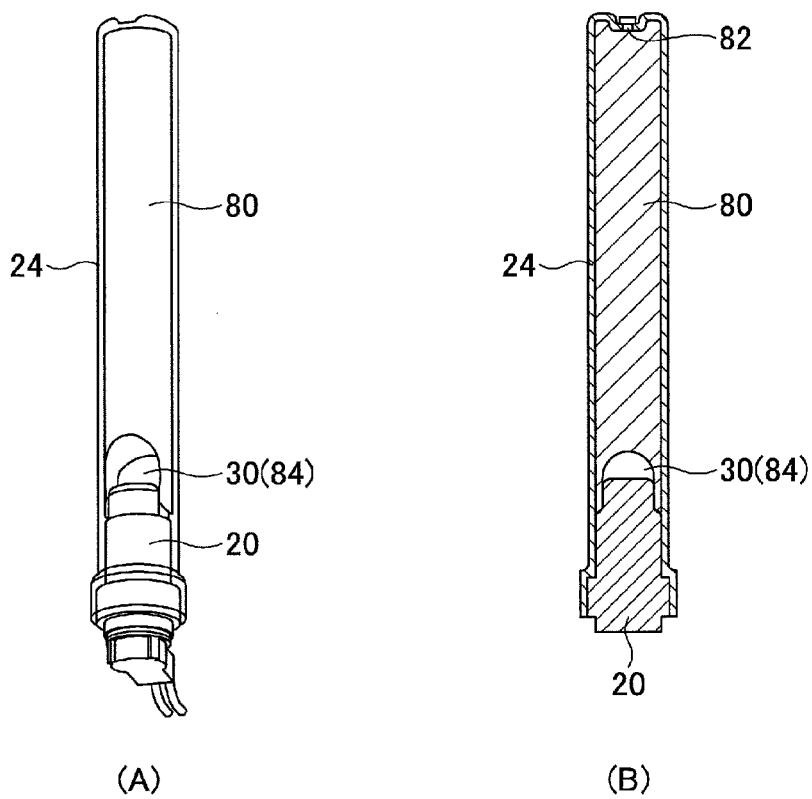
FIG. 9 is a drawing including a perspective view and a cut-away side view of a gas pressure actuator that includes a volume reducing part according to a variation of the present invention.

Also in this variation, an insert object 80 placed in the space 30 may be formed in the rocket part by insert molding. For example, as illustrated by FIG. 9, the insert object 80 may be insert-molded in the space 30 of the rocket part 24 by injecting a resin material of the insert object 80 into the space 30 through a hole 82 formed in the second axial end face of the rocket part 24. This method makes it possible to change an effective spatial volume 84 in the space 30 without increasing the number of components, and to securely fix the insert object 80 to the rocket part 24. Also, the insert object 80 prevents the gas from leaking out of the rocket part 24 when the rocket part 24 is put into operation, and thereby makes it possible to maintain the internal pressure of the space 30 (more specifically, the effective space volume 84) at a high level.

Also in the above embodiment, to implement a stopper function for preventing the rocket part 24 from jumping out of the internal space 26 of the launcher 22, the large diameter part 24a is provided at the first axial end of the rocket part 24 and the small diameter part 24b is provided adjacent to the second axial end of the large diameter part 24a. However, the present invention is not limited to this configuration. For example, the rocket part 24 may be configured such that its inside diameter gradually increases from the second axial end to the first axial end, and the outside diameter of the large diameter part 24a at the first axial end of the rocket part 24 becomes greater than the diameter of the opening 44 of the end plate 42.

Figure 10:
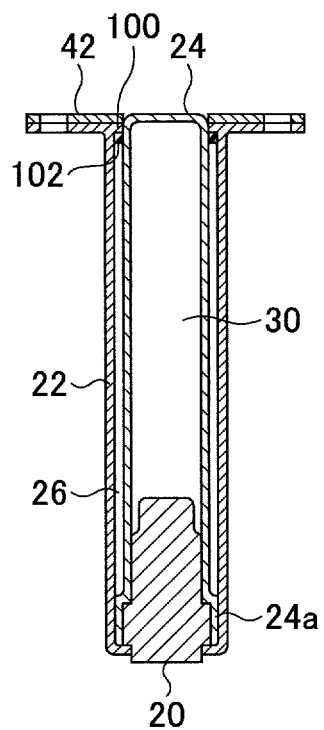
FIG. 10 is a cut-away side view of a gas pressure actuator according to a variation of the present invention.

Also in the above embodiment, the diameter of the opening 44 of the end plate 42 provided separately from the launcher 22 is made smaller than the outside diameter of the large diameter part 24a at the first axial end of the rocket part 24 to implement a stopper function for preventing the rocket part 24 from jumping out of the internal space 26 of the launcher 22 when the gas pressure actuator 10 is activated. However, the present invention is not limited to this configuration. For example, as illustrated by FIG. 10, protrusions 100 protruding toward the axial center may be provided at the second axial end of the launcher 22, and the diameter of the opening 32 at the protrusions 100 may be made less than the outside diameter of the large diameter part 24a at the first axial end of the rocket part 24 to implement a stopper function for preventing the rocket part 24 from jumping out of the internal space 26 of the launcher 22 when the gas pressure actuator 10 is activated.

In this variation, the protrusions 100 may either constitute the entire circumference or parts of the circumference of the second axial end of the launcher 22. When the protrusions 100 constitute parts of the entire circumference, the protrusions 100 are preferably formed at symmetrical positions with respect to the axial center. In this case, a gasket 102 made of a resin material may be provided adjacent to the first axial end side of the protrusions 100 to seal a gap between the second axial end of the launcher 22 and the second axial end of the rocket part 24.

Figure 11:
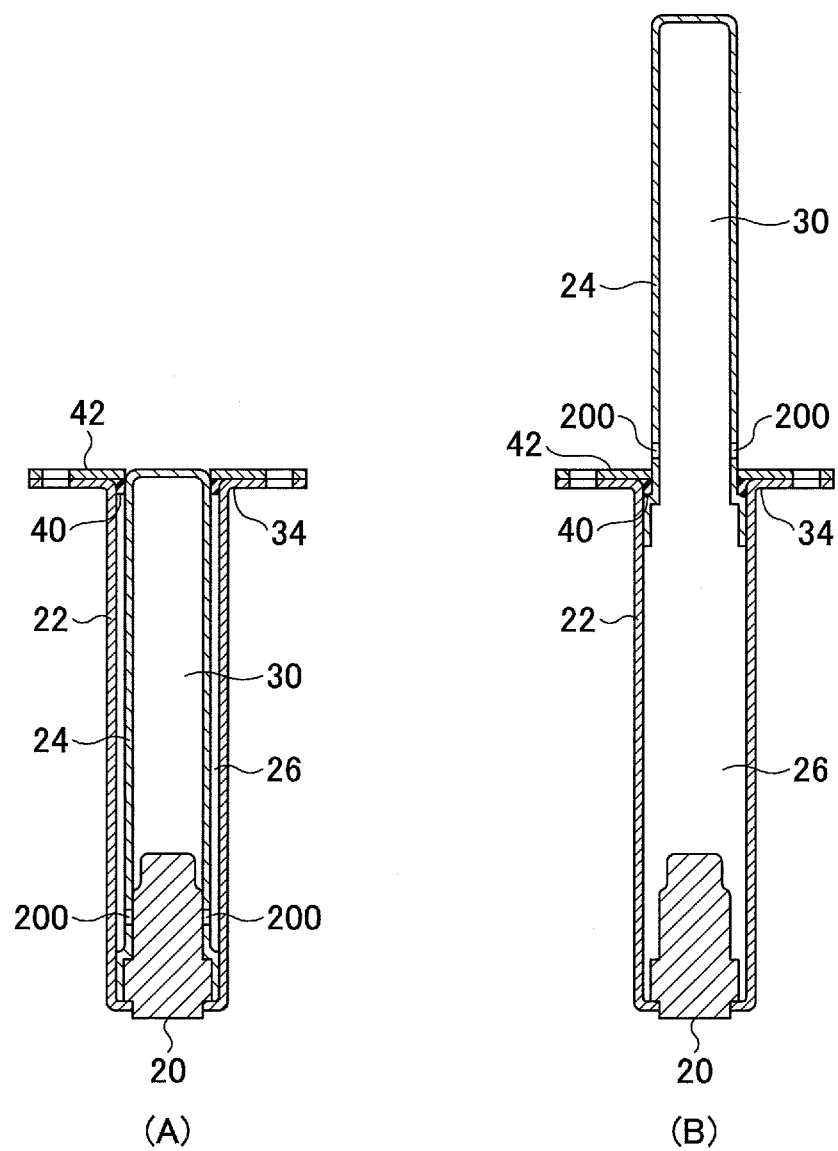
FIG. 11 is a drawing including cut-away side views of a gas pressure actuator before and after activation according to a variation of the present invention.

Also in the above embodiment, after the high-pressure gas is generated by the gas generator 20 upon activation and flows into an internal space of the rocket part 24 and the launcher 22, the gas pressure actuator 10 does not discharge the high-pressure gas from the internal space. However, the gas pressure actuator 10 may be configured to discharge the high-pressure gas from the internal space when the gas pressure actuator 10 is activated and reaches the maximum stroke or a position near the maximum stroke. For example, a gas vent 200 may be formed in the side wall of the rocket part 24 (i.e., an inner cylinder of the gas pressure actuator 10) near the first axial end such that the gas vent 200 communicates with the internal space 26 of the launcher 22 before activation (in a state illustrated by FIG. 11 (A)) and communicates with the external space when the gas pressure actuator is activated and reaches the maximum stroke or a position near the maximum stroke (in a state illustrated by FIG. 11 (B)).

One gas vent 200 or multiple gas vents 200 along the circumferential direction may be formed in the side wall of the rocket part 24 near the first axial end depending on a desired speed of discharging the high-pressure gas. The position in the axial direction of the gas vent 200 on the side wall of the rocket part 24 may be determined based on a timing to start discharging the high-pressure gas from the internal space of the rocket part 24 and the launcher 22.

According to the above variation, the pressure in the internal space of the rocket part 24 and the launcher 22 decreases after the gas pressure actuator 10 is activated and reaches the maximum stroke or a position near the maximum stroke. This configuration makes it possible to absorb an impact applied to the hood 16 and to further alleviate an impact applied to a pedestrian colliding with the vehicle 14.

Also in the above variation, the gas vent 200 is used to discharge the high-pressure gas from the internal space of the rocket part 24 and the launcher 22 when the gas pressure actuator 10 is activated and reaches the maximum stroke or a position near the maximum stroke. However, a gas vent may be provided to discharge the high-pressure gas from the internal space and thereby reduce the stroke length necessary to place the rocket part 24 back into the internal space 26 of the launcher 22 after the gas pressure actuator 10 is activated.

Also in the above variation, when the gas pressure actuator 10 is activated and reaches the maximum stroke or a position near the maximum stroke, the high-pressure gas is discharged from the internal space to absorb an impact applied to the hood 16. However, the present invention is not limited to this configuration. For example, the rocket part 24 may be configured to be deformed when the gas pressure actuator is activated and reaches the maximum stroke or a position near the maximum stroke, to absorb an impact applied to the hood 16. In this case, a slit may be formed at a predetermined position in the side wall of the rocket part 24 so that the rocket part 24 buckles at the slit when the rocket part 24 receives an impact greater than a predetermined level while being displaced.

Figure 12:
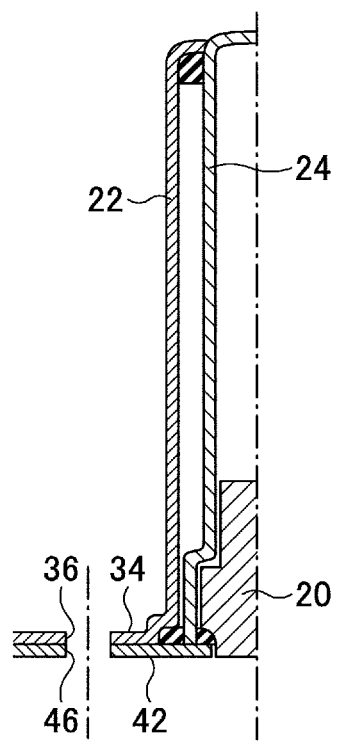
FIG. 12 is a cut-away side view of a gas pressure actuator according to a variation of the present invention.

Also in the above embodiment, the end plate 42 for fixing the gas pressure actuator 10 to an object is disposed on a side of the gas pressure actuator 10 that is opposite in the axial direction to the side on which the gas generator 20 is positioned, i.e., at the second axial end of the launcher 22 toward which the rocket part 24 is launched. However, the present invention is not limited to this configuration. As illustrated by FIG. 12, the end plate 42 may be disposed on a side of the gas pressure actuator 10 that is the same in the axial direction as the side on which the gas generator 20 is positioned, i.e., at the first axial end of the launcher 22.

Figure 13:
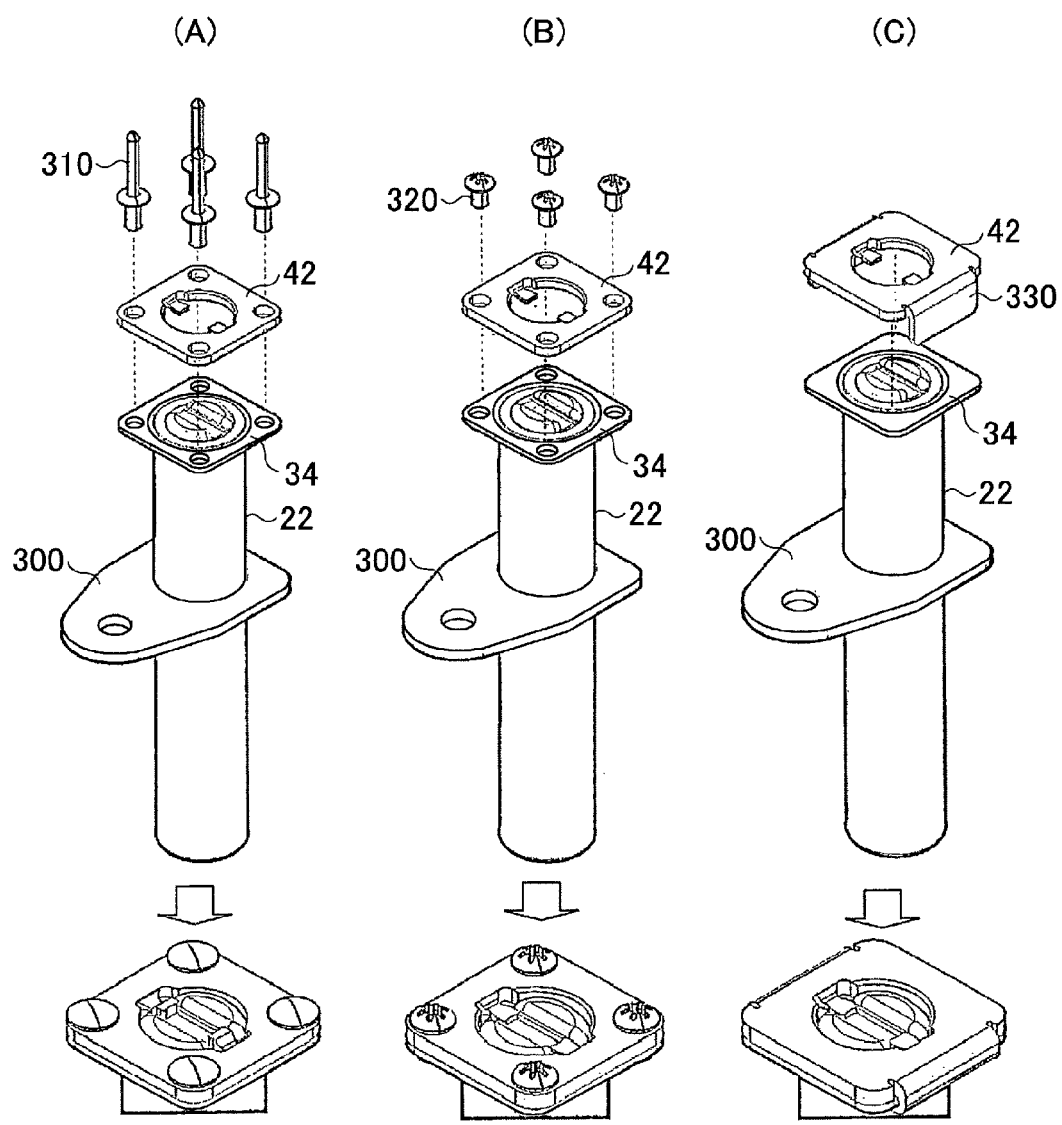
FIG. 13 is a drawing including perspective views of a gas pressure actuator before and after activation according to a variation of the present invention.

Also in the above embodiment, the end plate 42 has a flat shape that is substantially the same as the shape of the flange 34 of the launcher 22, and is bolted together with the flange 34 of the launcher 22 to an object (e.g., the body of the vehicle 14). However, the gas pressure actuator 10 may also be fixed to an object at any other position. For example, as illustrated by FIG. 13, a flange 300 to be fastened to an object may be provided in the middle of the launcher 22 in the axial direction, and the gas pressure actuator 10 may be fixed to an object at a position different from the position at which the end plate 42 and the flange 34 of the launcher 34 are joined together.

Means for fastening the end plate 42 and the flange 34 of the launcher 22 is not limited to bolts. For example, rivets 310 may be used for fastening as illustrated by FIG. 13 (A), tapping screws 320 may be used for fastening as illustrated by FIG. 13 (B), or crimping parts 330 for crimping the end plate 42 and the flange 34 of the launcher 22 together may be provided on the end plate 42 as illustrated by FIG. 13 (C).

Figure 14:
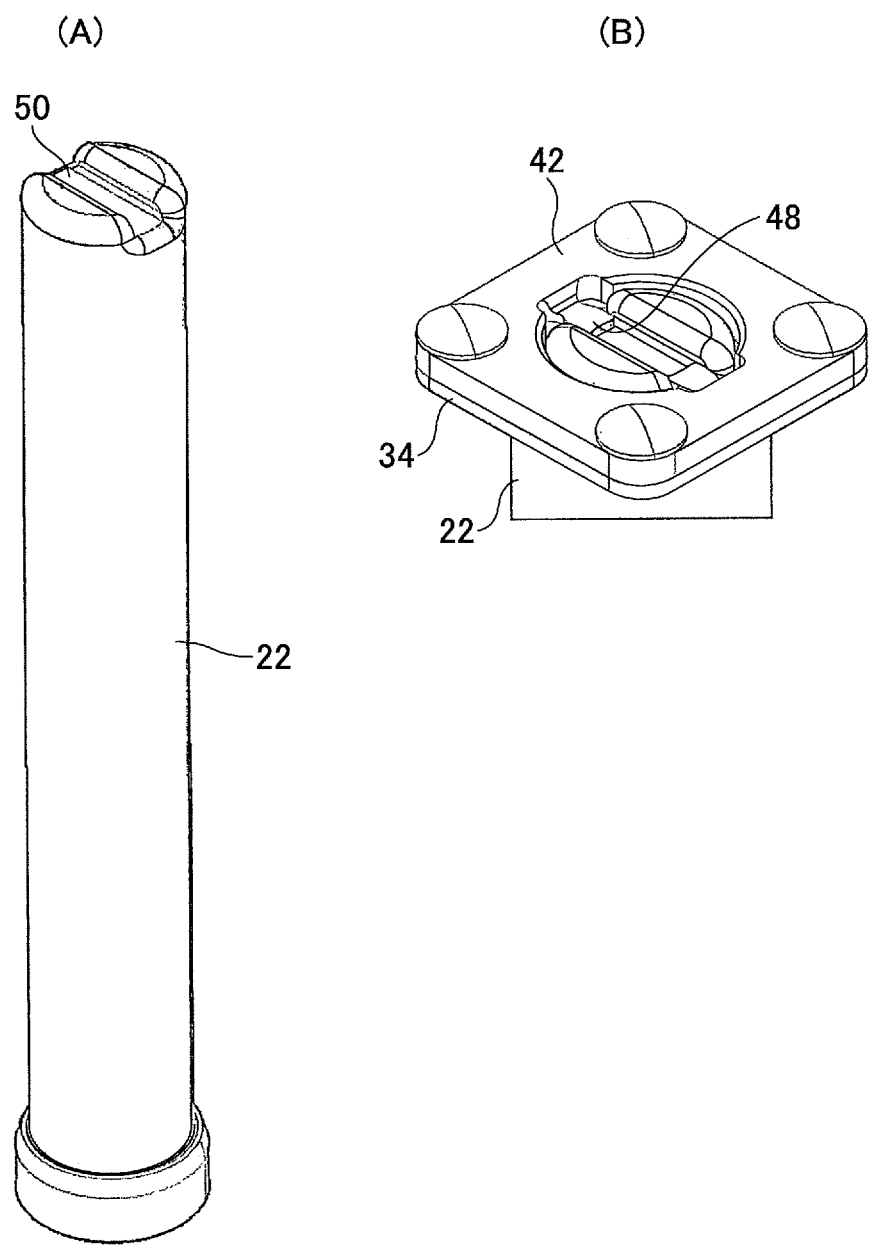
FIG. 14 is a drawing including perspective views of a rocket part of a gas pressure actuator according to a variation of the present invention and the gas pressure actuator including the rocket part.

Also in the above embodiment, the indented part 50 that engages the protrusions 48 of the end plate 42 is formed at the second axial end of the rocket part 24. When the protrusions 48 of the end plate 42 are formed at symmetrical positions about the axial center of the opening 44 as illustrated by FIG. 14, the indented part 50 may be formed across the second axial end face of the rocket part 24.

Also in the above embodiment, the end plate 42 includes the protrusions 48 that are used to (initially) position the second axial end of the rocket part 24 when the rocket part 24 is placed in the tubular space 26 of the launcher 22, and the ring-shaped gasket 40 is provided between the second axial end of the launcher 22 and the second axial end of the rocket part 24 to seal the gap between the launcher 22 and the rocket part 24 at the second axial end before activation. With this configuration, the gasket 40 is supported in the axial direction by the protrusions 48 of the end plate 42. Thus, this configuration makes it possible to prevent the gasket 40 from coming off the gas pressure actuator 10 in the axial direction.

In this variation, the thickness in the axial direction of the protrusions 48 of the end plate 42 may be less than the thickness in the axial direction of the main part of the end plate 42. In this configuration, as illustrated by FIG. 15 and FIG. 16 (A), the protrusion 48 is preferably formed to protrude from the first axial end side (which is adjacent to the gasket 40) of the inner wall of the opening 44 of the end plate 42 toward the axial center.

Figure 17:
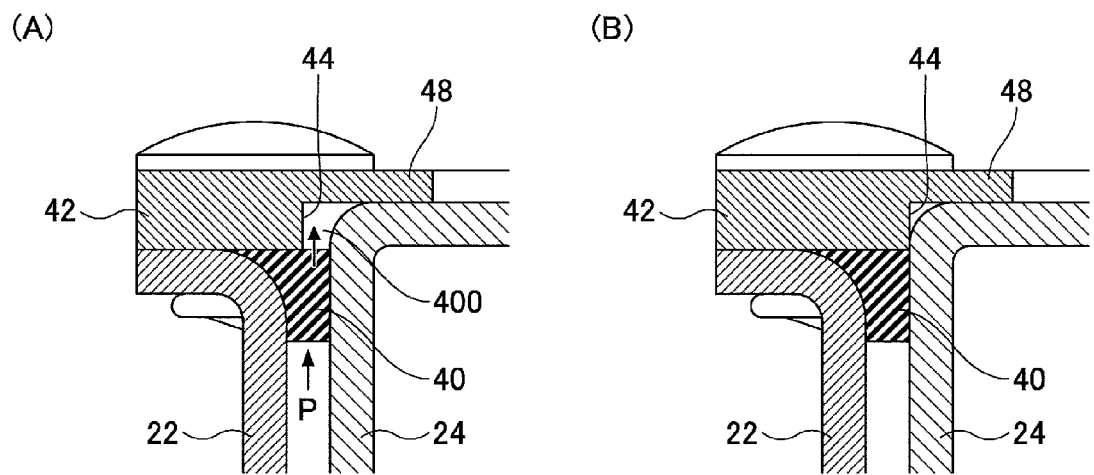
FIG. 17 is a drawing including cut-away side views of a part of a comparative structure to be compared with a gas pressure actuator according to a variation of the present invention.

When the protrusion 48 is formed to protrude from the second axial end side (which is away from the gasket 40) of the inner wall of the opening 44 of the end plate 42 toward the axial center as illustrated by FIG. 17 (A) and FIG. 17 (B) (comparative configurations), the following problems may occur. For example, with the comparative configuration of FIG. 17 (A) where a gap 400 is formed between the inner wall of the opening 44 of the end plate 42 and the side surface of the second axial end of the rocket part 24, a part of the second axial end face of the gasket 40 faces the gap 400 and not in contact with the end plate 48 in the axial direction. With this configuration, when the gas pressure actuator 10 is activated, the gasket 40 may be caused to enter the gap 400 and deformed by the internal pressure applied from the first axial end side and as a result, the sealing performance of the gasket 40 may be reduced. With the comparative configuration of FIG. 17 (B) where the gap 400 is not formed between the inner wall of the opening 44 of the end plate 42 and the side surface of the second axial end of the rocket part 24, and the diameter of the inner wall of the opening 44 is substantially the same as the outside diameter of the second axial end of the rocket part 24, unlike the comparative configuration of FIG. 17 (A), the sealing performance of the gasket 40 is not reduced. However, because the inner wall of the opening 44 of the end plate 42 is in contact with the side surface of the second axial end of the rocket part 24, the protrusion 48 is more likely to be sheared rather than being bent and deformed when the rocket part 24 is thrust upward. As a result, the protrusion 48 may be cut off the main part of the end plate 42 and fly apart when the gas pressure actuator 10 is activated.

Figure 15:
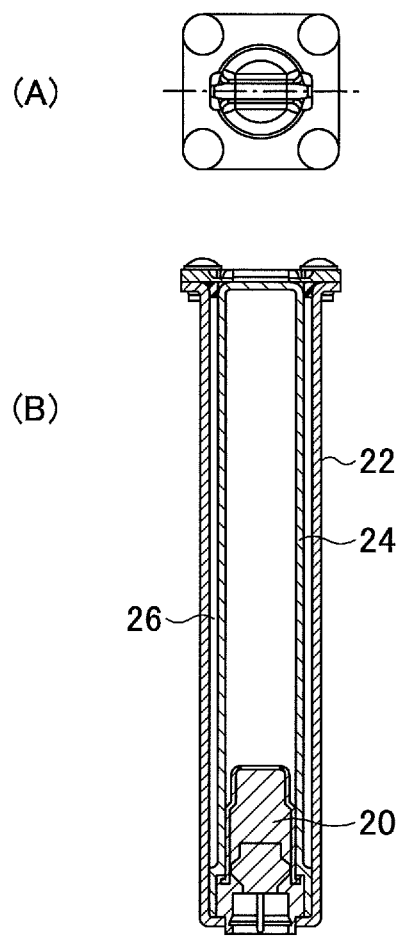
FIG. 15 is a cut-away side view of a gas pressure actuator according to a variation of the present invention.
Figure 16:
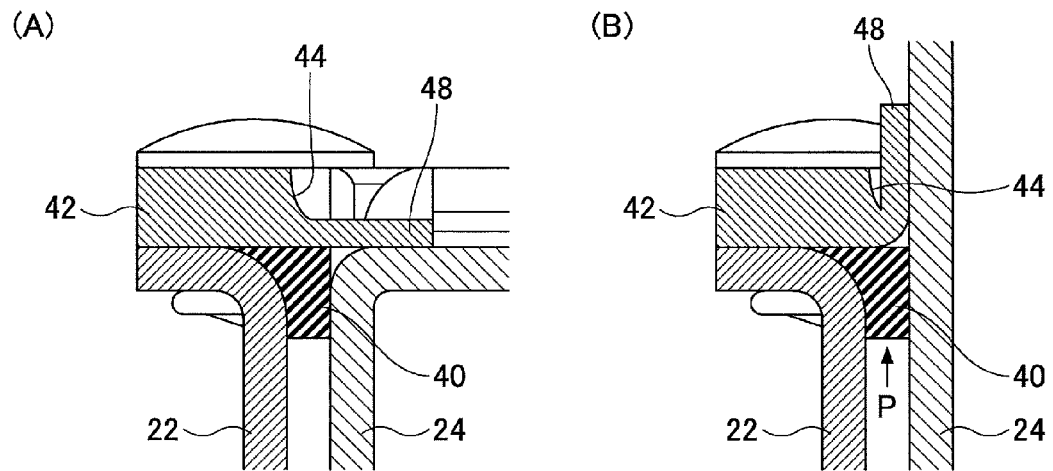
FIG. 16 is a drawing including cut-away side views of a part of a gas pressure actuator according to a variation of the present invention.

On the other hand, with the configuration illustrated by FIG. 15 and FIG. 16 (A) where the protrusion 48 protrudes from the first axial end side (which is adjacent to the gasket 40) of the inner wall of the opening 44 of the end plate 42 toward the axial center, the entire second axial end face of the gasket 40 is in contact with and supported by the protrusions 48 of the end plate 42. This configuration makes it possible to prevent the gasket 40 from being moved toward the second axial end by the internal pressure applied from the first axial end side when the gas pressure actuator 10 is activated. This in turn makes it possible to maintain the sealing performance of the gasket 40, and to achieve a desired thrust force and stroke of the gas pressure actuator 10.

With the configuration of this variation, the protrusion 48 of the end plate 42 is bent and deformed instead of being sheared when the rocket part 24 is displaced toward the second axial direction upon activation. This in turn makes it possible to prevent the protrusion 48 from being cut off the main part of the end plate 42 and fly apart when the gas pressure actuator 10 is activated and the rocket part 24 is displaced.

In the configuration of this variation, the thickness in the axial direction of the protrusion 48 is preferably set at a value that enables the protrusion 48 to resist an inertial force applied when the rocket part is placed in a vibration environment before activation and a repulsive force of the gasket 40 made of an elastic material such as rubber, and that allows the protrusion 48 to yield and bend without blocking the rocket part 24 even in a low-temperature environment where the thrust force applied to the rocket part 24 upon activation is smallest. The bendability of the protrusion 48 is linearly inversely proportional to a value obtained by multiplying the square of the thickness of the protrusion 48 by a tensile strength of the material of the protrusion 48.

Also in the above embodiment, when the gas pressure actuator 10 is activated, the rocket part 24 slides on the inner wall of the launcher 22 and is displaced toward the second axial end relative to the launcher 22. As a result, the windshield side of the hood 16 is lifted to alleviate an impact applied by the hood 16 to a pedestrian who is hit, for example, by a front bumper of the vehicle 14. Here, there is a case where, after the gas pressure actuator 10 is activated, a load of the pedestrian is applied to the rocket part in a direction that is tilted with respect to the axial direction of the rocket part 24. In this case, an edge at the first axial end of the rocket part 24 may scratch the inner wall of the launcher 22 and the rocket part 24 may be stuck in the launcher 22.

Figure 18:
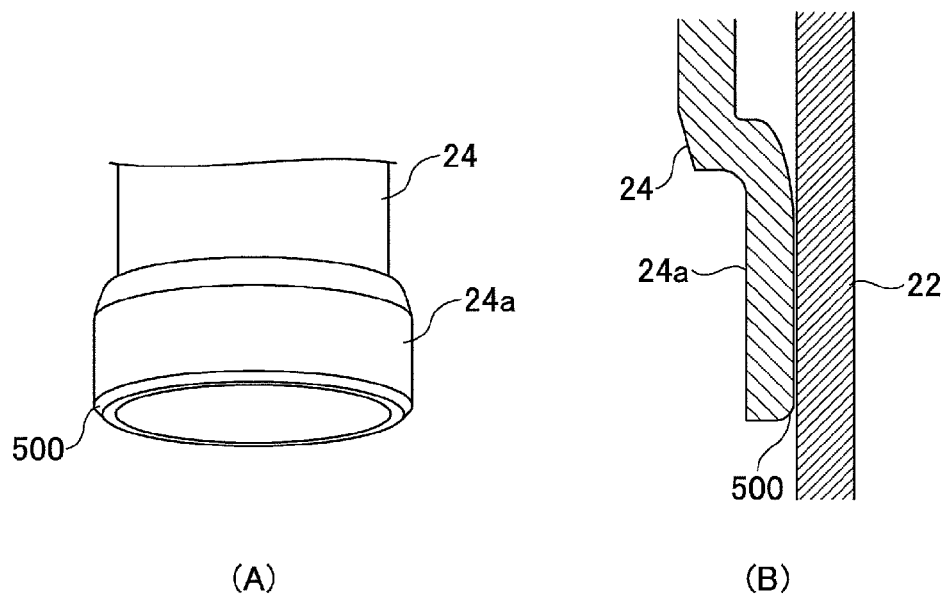
FIG. 18 is a drawing including a perspective view and a cut-away side view of a part of a gas pressure actuator according to a variation of the present invention.

To prevent this problem, as illustrated by FIG. 18, an outer circumference edge 500 at the first axial end of the rocket part 24 (more specifically, an edge at the first axial end of the large diameter part 24a) may be chamfered or rounded. The width of the chamfered or rounded edge is preferably greater than or equal to 0.5 mm. It is also effective to apply a flame retardant grease or a hard coat lubricant to the chamfered or rounded edge. This configuration makes it possible to prevent an edge at the first axial end of the rocket part 24 from scratching the inner wall of the launcher 22 and prevent the rocket part 24 from being stuck in the launcher 22, and enables the gas pressure actuator 10 to contract smoothly.

Figure 19:
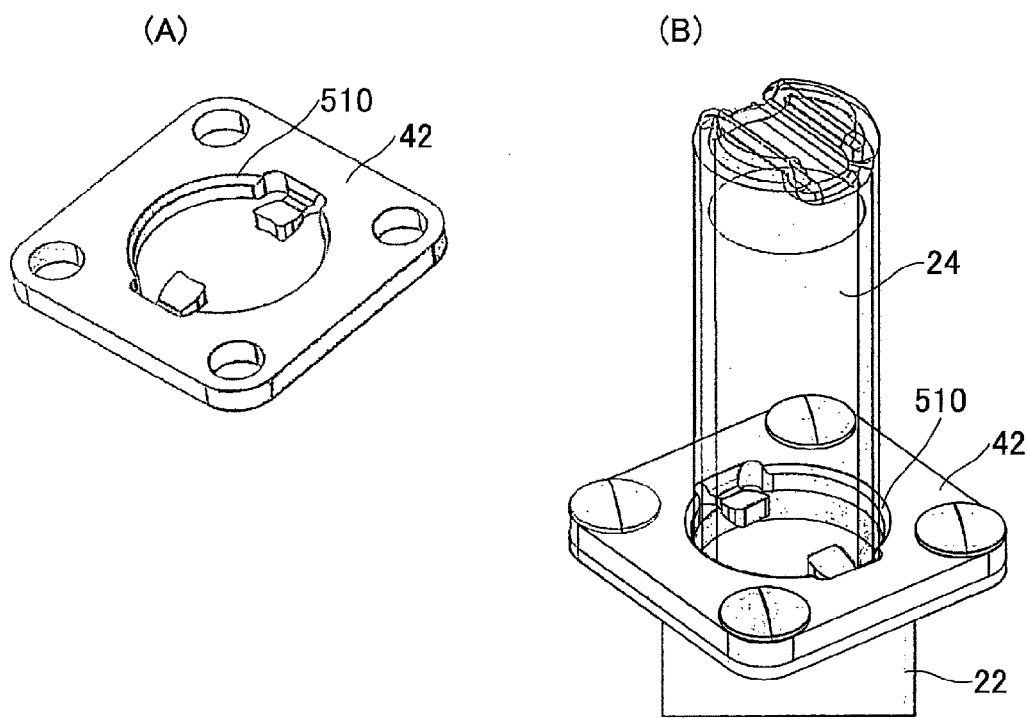
FIG. 19 is a drawing including perspective views of an end plate of a gas pressure actuator according to a variation of the present invention and the gas pressure actuator including the end plate.

Also, as illustrated by FIG. 19, an edge 510 at the second axial end of the opening 44 of the end plate 42 may be chamfered or rounded. This configuration makes it possible to prevent the rocket part 24 from being rubbed and scratched by the edge 510 at the second axial end of the opening 44 of the end plate 42 when the rocket part 24 is caused by an applied load to enter the tubular space 26 of the launcher 22 at an angle with respect to the axial direction and prevent the rocket part 24 from being stuck in the launcher 22, and enables the gas pressure actuator 10 to contract smoothly.

Figure 20:
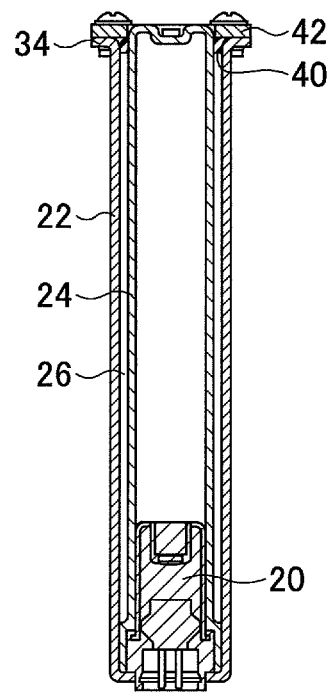
FIG. 20 is a drawing including a cut-away side view and perspective views of a gas pressure actuator according to a variation of the present invention.
Figure 20:
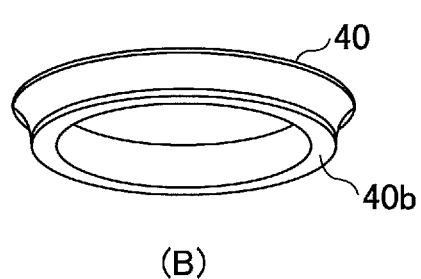
Figure 20:
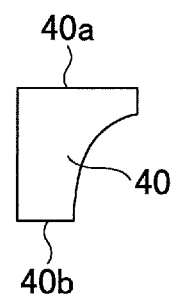

Also in the above embodiment, the gasket 40 for filling the gap 38 between the second axial end of the launcher 22 and the second axial end of the rocket part 24 has a ring shape and is implemented by, for example, an O-ring that surrounds the outer circumference of the rocket 24. However, the present invention is not limited to this configuration. For example, as illustrated by FIG. 20, the ring-shaped gasket 40 may include a second axial end surface 40a that is brought into contact with the end plate 42a and a first axial end surface 40b that faces the tubular space 26 of the launcher 22. The surface 40a has an area that is greater than the area of the surface 40b, and the width in the radial direction of the surface 40a is greater than the width in the radial direction of the surface 40b. With this configuration, the gasket 40 is in contact with the inner surface of the second axial end of the launcher 22 and the outer surface of the second axial end of the rocket part 24 before activation, and is also supported by the end plate 42a on the second axial end side. This configuration makes it possible to reliably seal the gap between the launcher 22 and the rocket part 24 at the second axial end. In this case, outer edges of the surface 40a and the surface 40b of the gasket 40 may be chamfered or rounded to conform to the joint between the main part of the launcher 22 and the flange 34.

Figure 21:
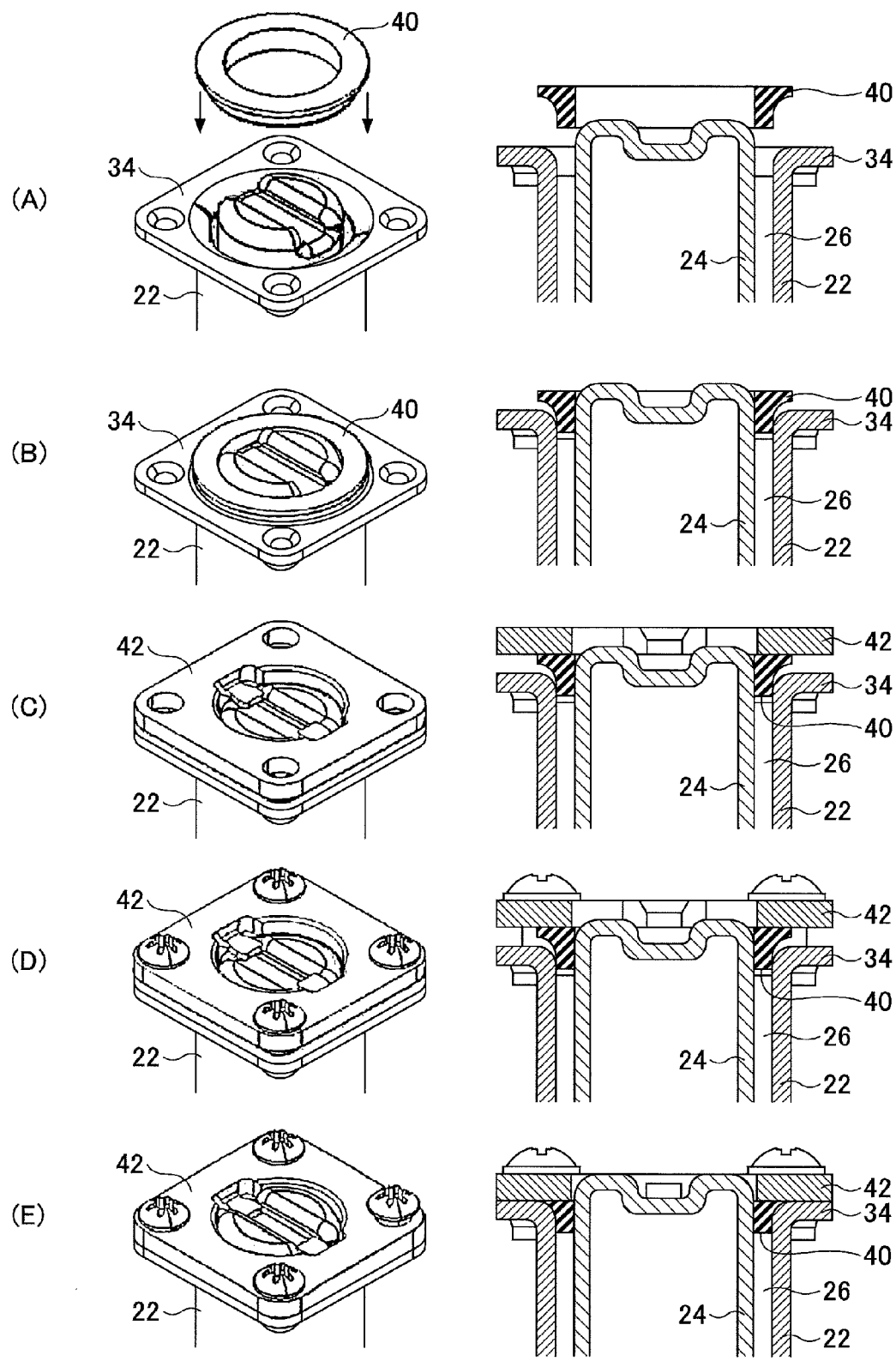
FIG. 21 is a drawing illustrating an exemplary process of assembling the gas pressure actuator of FIG. 20.

In the configuration of this variation, after assembling the launcher 22 and the rocket 24 to form the gap 38 at the second axial end, the gasket 40 is placed on the second axial end to block the gap 38 (FIG. 21 (A)), and at least a part of the gasket 40 is fit around the outer circumferential surface of the rocket part 24 (FIG. 21 (B)). Next, the end plate 42 is placed on the second axial end to contact the gasket 40 (FIG. 21 (C)), and the end plate 42 and the launcher 22 are fixed together using fixing parts such as rivets or bolts (FIGS. 21 (D) and (E)).

With the configuration of this variation, the gasket 40 is displaced in a direction from the second axial end toward the first axial end and is compressed by a wedge effect in the process of fixing the end plate and the launcher 22 together using fixing parts. Accordingly, this configuration makes it possible to easily set the gasket 40 in a predetermined position during the process of assembling the gas pressure actuator 10. Because the gasket 40 is a part on which the rocket part 24 slides when the gas pressure actuator 10 is activated, the gasket 40 is generally made of an elastic body with a relatively high hardness. The above configuration makes it possible to easily set the gasket 40 in a predetermined position even when the gasket 40 has a relatively high hardness.

When the gas pressure actuator 10 is activated in a condition where the load of the hood 16 is not applied to the gas pressure actuator 10 (no-load operation), almost the whole energy generated by the displacement of the rocket part 24 to thrust the hood 16 is applied to the end plate 42 when the first axial end of the rocket part 24 (more specifically, a flange of the large diameter part 24a) is brought into contact with the end plate 42, and the rocket part 24 may jump out of the launcher 22. With the above described configuration including the gasket 40, however, the rocket part 24 contacts the gasket 40, i.e., an elastic body, before contacting the end plate 42, and therefore the impact applied by the rocket part 24 to the end plate 42 can be reduced. Thus, the gasket 40 can provide three functions with one component, i.e., a function as a piston ring to prevent the escape of a gas pressure during operation, a function to prevent dust and drips from entering the tubular space 26, and a function as a shock absorber to reduce the impact applied by the rocket part 24 to the end plate 42 in the no-load operation.

Figure 22:
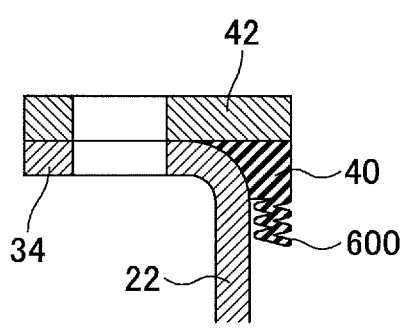
FIG. 22 is a drawing including cut-away side views of a part of a gas pressure actuator according to a variation of the present invention.
Figure 22:
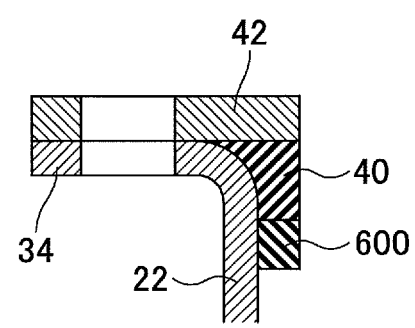

As described above, because the gasket 40 is a part on which the rocket part 24 slides when the gas pressure actuator 10 is activated, the gasket 40 is generally made of an elastic body with a relatively high hardness. However, when a rubber material with a high hardness is used for the gasket 40, the shock-absorbing performance of the gasket 40 may become insufficient. To achieve a sufficient shock-absorbing performance using a rubber material with a high hardness, as illustrated by FIG. 22 (A), a spring part 40c having a shape (e.g., bellows shape) that provides a spring characteristic may be provided as an integral part of the gasket 40. When it is difficult to use a material or a shape suitable to achieve a shock-absorbing performance, as illustrated by FIG. 22 (B), a separate shock-absorbing part 600 may be provided adjacent to the first axial end side of the gasket 40. For example, the shock-absorbing part 600 may be fixed to the gasket 40 using an adhesive. The above variations make it possible to improve the shock-absorbing function.

Also in the above embodiment, the gasket 40 is provided at the second axial end of the gas pressure actuator 10 to seal a gap between the launcher 22 and the rocket part 24 at the second axial end. However, a gasket may be provided not only at the second axial end of the gas pressure actuator 10, but also at the first axial end of the gas pressure actuator 10.

Figure 23:
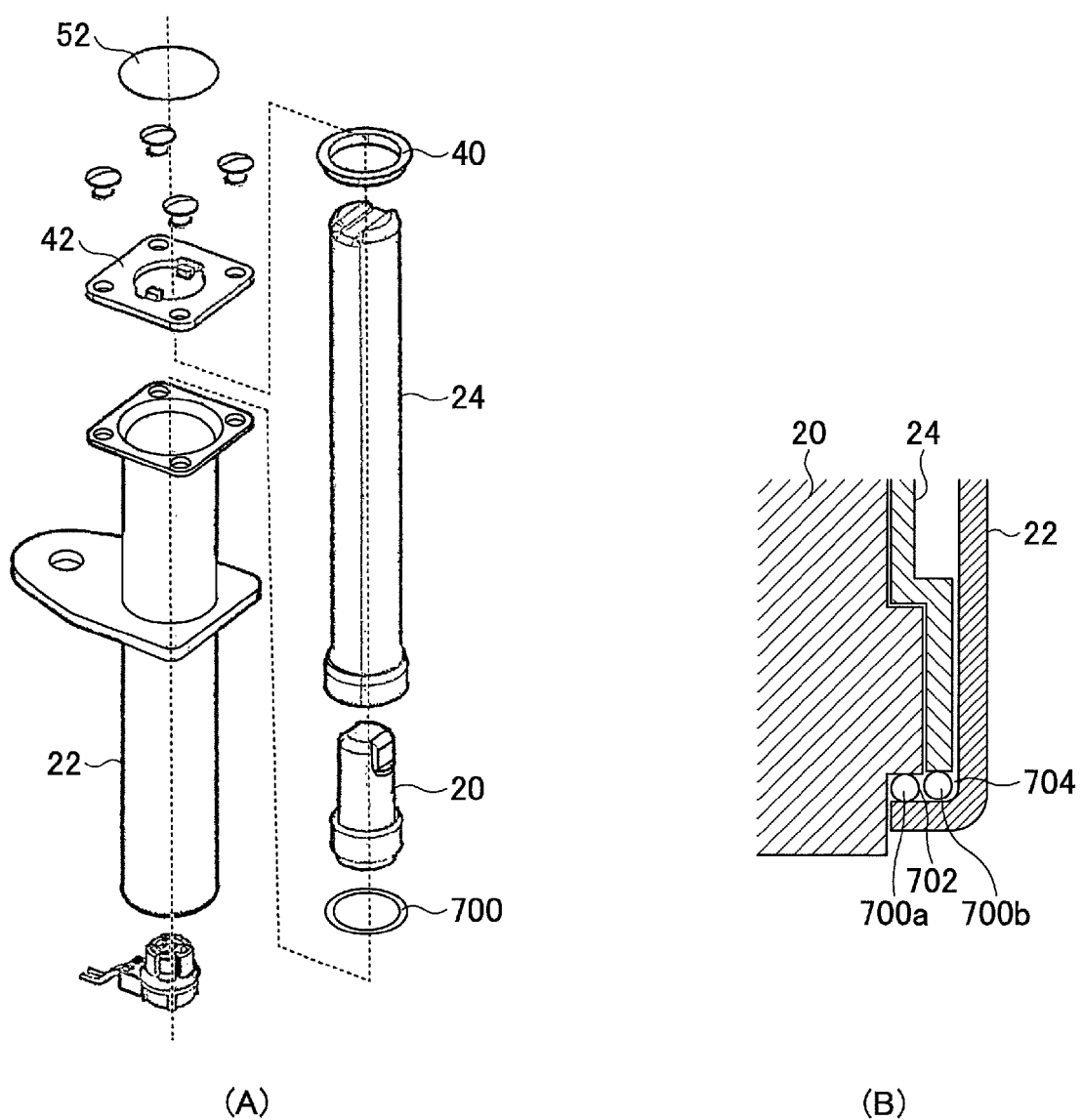
FIG. 23 is a drawing including a perspective view and a cut-away side view of a part of a gas pressure actuator according to a variation of the present invention.

For example, as illustrated by FIG. 23, a ring-shaped gasket 700a may be provided in an axial end space 702 between a flange at the first axial end of the large diameter part 20b of the gas generator 20 and the inner first axial end face of the launcher 22. This configuration makes it possible to prevent dust and drips from entering the gas pressure actuator 10 from the first axial end. That is, this configuration makes it possible to prevent intrusion of dust and drips at the first axial end, i.e., the forefront of the gas pressure actuator 10.

Similarly, as illustrated by FIG. 23, a ring-shaped gasket 700b may be provided in an axial end space 704 between the inner first axial end face of the launcher 22 and the first axial end of the large diameter part 24a of the rocket part 24. This configuration makes it possible to prevent dust and drips from entering the gas pressure actuator 10 from the first axial end, and makes it possible to achieve the dust proofness and the drip proofness without increasing the length of the gas pressure actuator 10.

Further in the above embodiment, the gas pressure actuator 10 includes the launcher 22 as an outer cylinder and the rocket part 24 as an inner cylinder. However, the present invention is not limited to this configuration. For example, a launcher may be implemented as an inner cylinder, and a rocket part may be implemented as an outer cylinder.

The present international application is based on and claims the benefit of priority of Japanese Patent Application No. 2012-158057 filed on Jul. 13, 2012, and Japanese Patent Application No. 2013-090306 filed on Apr. 23, 2013, the entire contents of which are hereby incorporated herein by reference.

EXPLANATION OF REFERENCES

10 Gas pressure actuator
20 Gas generator
22 Launcher
24 Rocket part
26 Tubular space
34 Flange
40 Gasket
42 End plate
44 Opening

The invention claimed is:

1. A gas pressure actuator, comprising:
a launcher that has a cylindrical shape and has a first axial end and a second axial end, the launcher including a fixing bracket formed at the second axial end of the launcher as an integral part of the launcher;
a gas generator that is coaxial with the launcher, is disposed at the first axial end of the launcher, and generates a high-pressure gas when the gas pressure actuator is activated;
a hollow rocket part that is coaxial with the launcher, the rocket part being open at the first axial end of the launcher and being closed at the second axial end of the launcher, and a first axial end of the rocket part overlapping the gas generator in an axial direction before the gas pressure actuator is activated; and
a flat end plate that includes an opening having a diameter greater than an outside diameter of a second axial end of the rocket part, the end plate being fixed together with the fixing bracket to an object,
wherein the diameter of the opening of the end plate is less than an outside diameter of the first axial end of the rocket part.

2. The gas pressure actuator as claimed in claim 1, wherein the second axial end of the rocket part is positioned by the end plate before the gas pressure actuator is activated.

3. The gas pressure actuator as claimed in claim 1, wherein an inside diameter of the second axial end of the launcher is greater than or equal to the outside diameter of the second axial end of the rocket part, and is less than the outside diameter of the first axial end of the rocket part.

4. The gas pressure actuator as claimed in claim 1, further comprising:
a gasket that seals a gap between the launcher and the rocket part at the second axial ends of the launcher and the rocket part.

5. The gas pressure actuator as claimed in claim 1, further comprising:
a volume reducing part that is placed in an internal space of the rocket part to reduce an effective spatial volume of the internal space.

6. The gas pressure actuator as claimed in claim 1, wherein a gas vent is formed in a side wall of one of the launcher and the rocket part which functions as an inner cylinder,
wherein the gas vent discharges a gas filling the inner cylinder when the gas pressure actuator is activated and a stroke of the launcher and the rocket part reaches a predetermined stroke length.

7. The gas pressure actuator as claimed in claim 1, further comprising:
a shock absorbing mechanism that is provided in at least one of the launcher and the rocket part,
wherein the shock absorbing mechanism causes the at least one of the launcher and the rocket part to deform to absorb an impact applied from an outside when the gas pressure actuator is activated and a stroke of the launcher and the rocket part reaches a predetermined stroke length.

8. A method of assembling a gas pressure actuator that includes
a launcher having a cylindrical shape,
a gas generator that is coaxial with the launcher, is disposed at a first axial end of the launcher, and generates a high-pressure gas when the gas pressure actuator is activated, and
a hollow rocket part that is coaxial with the launcher, the rocket part being open at the first axial end of the launcher and being closed at a second axial end of the launcher, and a first axial end of the rocket part overlapping the gas generator in an axial direction before the gas pressure actuator is activated,
the method comprising:
a first step of inserting the gas generator into an opening of the first axial end of the rocket part;
a second step of inserting the rocket part, which houses the gas generator that is inserted in the first step into the opening at the first axial end of the rocket part, into a tubular space of the launcher such that the gas generator is disposed at the first axial end of the launcher; and
a third step of fixing a stroke limiting part to the second axial end of the launcher housing the rocket part inserted in the second step into the tubular space, the stroke limiting part preventing a stroke of the rocket part and the launcher from exceeding a predetermined stroke length.

9. The method of assembling the gas pressure actuator as claimed in claim 8, wherein the launcher includes a fixing bracket that is formed at the second axial end of the launcher as an integral part of the launcher.

10. The method of assembling the gas pressure actuator as claimed in claim 9, wherein the stroke limiting part is a flat end plate that includes an opening having a diameter greater than an outside diameter of a second axial end of the rocket part, the end plate being fixed together with the fixing bracket to an object.

* * * * *